US010509139B2

(12) United States Patent
Ozdemir et al.

(10) Patent No.: US 10,509,139 B2
(45) Date of Patent: Dec. 17, 2019

(54) REMOVING NOISE FROM A SEISMIC MEASUREMENT

(71) Applicant: WESTERNGECO L.L.C., Houston, TX (US)

(72) Inventors: Ahmet Kemal Ozdemir, Asker (NO); Bent Andreas Kjellesvig, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 1303 days.

(21) Appl. No.: 13/847,384

(22) Filed: Mar. 19, 2013

(65) Prior Publication Data
US 2014/0288841 A1 Sep. 25, 2014

(51) Int. Cl.
G01V 1/36 (2006.01)
G01V 1/38 (2006.01)

(52) U.S. Cl.
CPC ............. G01V 1/364 (2013.01); G01V 1/38 (2013.01); G01V 2210/1423 (2013.01); G01V 2210/3242 (2013.01); G01V 2210/3246 (2013.01); G01V 2210/34 (2013.01)

(58) Field of Classification Search
CPC ........ G01V 1/364; G01V 1/28; G01V 1/3817; G01V 1/3808; G01S 1/725
USPC ................. 367/24, 117; 702/16, 17
See application file for complete search history.

(56) References Cited

U.S. PATENT DOCUMENTS

| 4,951,263 A * | 8/1990 | Shope | G01S 1/725 367/117 |
|---|---|---|---|
| 6,446,008 B1 | 9/2002 | Ozbek | |
| 6,651,007 B2 | 11/2003 | Ozbek | |
| 2008/0151689 A1* | 6/2008 | Goujon | G01V 1/364 367/24 |
| 2008/0270035 A1* | 10/2008 | Ozdemir | G01V 1/3808 702/17 |
| 2009/0276159 A1 | 11/2009 | Strobbia | |
| 2010/0286919 A1* | 11/2010 | Lee | G01V 1/28 702/16 |
| 2011/0103182 A1* | 5/2011 | Martin | G01V 1/364 367/24 |
| 2011/0103183 A1* | 5/2011 | Ozdemir | G01V 1/364 367/24 |
| 2011/0120724 A1 | 5/2011 | Krohn | |
| 2012/0082000 A1 | 4/2012 | Perciot et al. | |
| 2012/0163122 A1* | 6/2012 | Ozdemir | G01V 1/364 367/24 |

(Continued)

FOREIGN PATENT DOCUMENTS

GB 2458642 9/2009

OTHER PUBLICATIONS

International Search Report and Written Opinion of PCT Application No. PCT/US2014/030947 dated Aug. 26, 2014: pp. 1-14.

(Continued)

Primary Examiner — Regis J Betsch
Assistant Examiner — Kaleria Knox
(74) Attorney, Agent, or Firm — Jeremy P. Welch

(57) ABSTRACT

A technique includes using a filter having filtering parameters based at least in part on a dispersion curve of at least one vibration mode of a streamer to filter a measurement acquired by at least one sensor of the streamer and using results of the filtering to suppress vibration noise present in the measurement.

15 Claims, 17 Drawing Sheets

(56) References Cited

U.S. PATENT DOCUMENTS

2012/0201096 A1     8/2012   Valero et al.
2013/0028050 A1*   1/2013   Ozdemir .............. G01V 1/3817
                                                             367/24

OTHER PUBLICATIONS

Cetin et al., "Eguiripple FIR Filter Design by the FFT Algorithm," IEEE Signal Processing Magazine, Mar. 1997: pp. 60-64.
Gustafsson, "Determining the Initial States in Forward-Backward Filtering," IEEE Transactions on Signal Processing, Apr. 1996, vol. 44(4): pp. 988-992.
McClellan et al., "A Computer Program for Designing Optimum FIR Linear Phase Digital Filters," IEEE Transactions on Audio and Electroacoustics, Dec. 1973, vol. AU-21(6): pp. 506-526.
Search Report for the equivalent European patent application 14770173.4 dated Oct. 18, 2016.
Search Report for the equivalent European patent application for 14770173.4 dated Jan. 19, 2017.

* cited by examiner

REMOVING NOISE FROM A SEISMIC MEASUREMENT

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In an exemplary implementation, a technique includes using a filter having filtering parameters based at least in part on a dispersion curve for at least one vibration mode of a streamer to filter a measurement acquired by at least one sensor of the streamer and using results of the filtering to suppress vibration noise present in the measurement.

In another exemplary implementation, an apparatus includes an interface and a processor. The interface receives data representing a measurement acquired by at least one sensor of a streamer while the sensor is towed. The processor is adapted to filter the data based at least in part on a dispersion curve for at least one vibration mode of the streamer to suppress the vibration noise present in the measurement.

In yet another exemplary implementation, an article including a non-transitory computer readable storage medium to store instructions that when executed by a computer cause the computer to use a filter having filtering parameters based at least in part on a dispersion curve for at least one vibration mode of a streamer to filter a measurement acquired by at least one sensor of the streamer and use results of the filtering to suppress vibration noise present in the measurement.

Advantages and other features will become apparent from the following drawing, description and claims.

DETAILED DESCRIPTION

Figure 1:
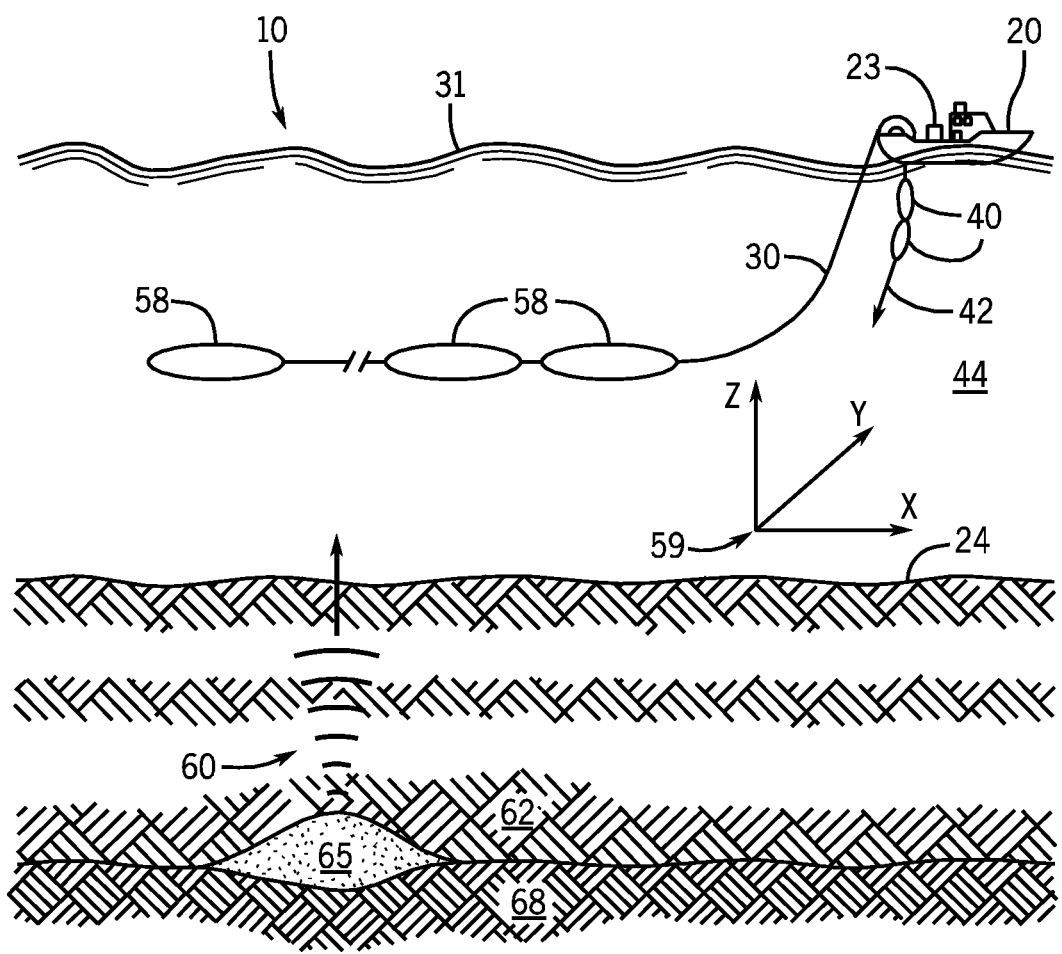
FIG. 1 is a schematic diagram of a marine-based seismic data acquisition system according to an example implementation.

FIG. 1 depicts an embodiment 10 of a marine-based seismic data acquisition system in accordance with some implementations. In the system 10, a survey vessel 20 tows one or more seismic streamers 30 (one exemplary streamer 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 58, which include, in accordance with some implementations, multi-component sensors. Each multi-component sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular implementation, the multi-component seismic sensor may include one or more hydrophones, geophones, particle displacement sensors, particle velocity sensors, accelerometers, pressure gradient sensors or combinations thereof.

For example, in accordance with some implementations, a particular seismic sensor unit 58 may include at least one particle motion sensor 70 for purposes of measuring a component of particle motion along a particular sensitive axis 59 (the x, y or z axis, for example). As a more specific example, the seismic sensor unit 58 may include a particle velocity sensor that is oriented to acquire a measurement of a particle velocity along the depth, or z, axis; a particle velocity sensor to sense a particle velocity along the crossline, or y, axis; a particle velocity sensor to sense a velocity along the inline, or x, axis; multiple particle velocity sensors to sense particle velocities along all three (x, y and z) axes; etc. Alternatively, in other implementations, the particle motion sensor(s) of each seismic sensor unit 58 may sense a particle motion other than velocity (an acceleration, for example).

It is noted that in accordance with some implementations, each seismic sensor unit 58 may contain a single component sensor, such as a pressure sensor. Thus, many variations are contemplated and are within the scope of the appended claims.

In addition to the seismic sensor units 58, the marine seismic data acquisition system 10 also includes one or more seismic sources 40 (two exemplary seismic sources 40 being depicted in FIG. 1), such as air guns and the like. In some implementations, the seismic source(s) 40 may be coupled to, or towed by, the survey vessel 20. Alternatively, in other implementations, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the source(s) 40 produce corresponding reflected acoustic signals, or pressure waves 60, which are sensed by the seismic sensors of the seismic sensor unit 58. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the seismic sensor units 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some implementations. For example, a particular seismic sensor unit 58 may provide a trace, which corresponds to a measure of a pressure wavefield by its hydrophone; and the seismic sensor unit 58 may provide (depending on the particular implementation) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular implementation, portions of the analysis of the representation may be performed on the seismic survey vessel 20, such as by the signal processing unit 23. In accordance with other implementations, the representation may be processed by a data processing system that may be, for example, located on land or on the vessel 20.

The streamer 30 may be subject to several modes of operations due to the constant excitation of water flowing around the streamer 30. Although the pressure sensors may be constructed to be relatively insensitive to vibration by design, the particle motion sensors are by their nature insensitive to the self-vibration of the streamer 30. Therefore, the particle motion sensors may acquire measurements with streamer-borne noise having amplitudes that are several orders of magnitudes stronger than noise amplitudes of the corresponding noise acquired by the particle motion sensors. Techniques are disclosed herein for purposes of suppressing streamer-borne noise acquired by seismic sensors, such as towed particle motion sensors or towed hydrophones (as examples).

A particular predominant streamer-borne noise is vibration noise, as the streamer 30 is subject to several modes of vibration due to the constant excitation of water flowing about the streamer 30. In particular, the inline aligned (i.e., aligned with the streamer axis x, as depicted by the axes 59 of FIG. 1) particle motion sensors acquire measurements of longitudinal vibrations along the length of the streamer 30. The crossline-aligned and vertically-aligned particle motion sensors acquire measurements that are sensitive to flexural vibrations that are normal to the longitudinal axis and torsional (or "angular") vibrations that are oscillating due to angular motions of the streamer 30 about its longitudinal axis.

Figure 2:
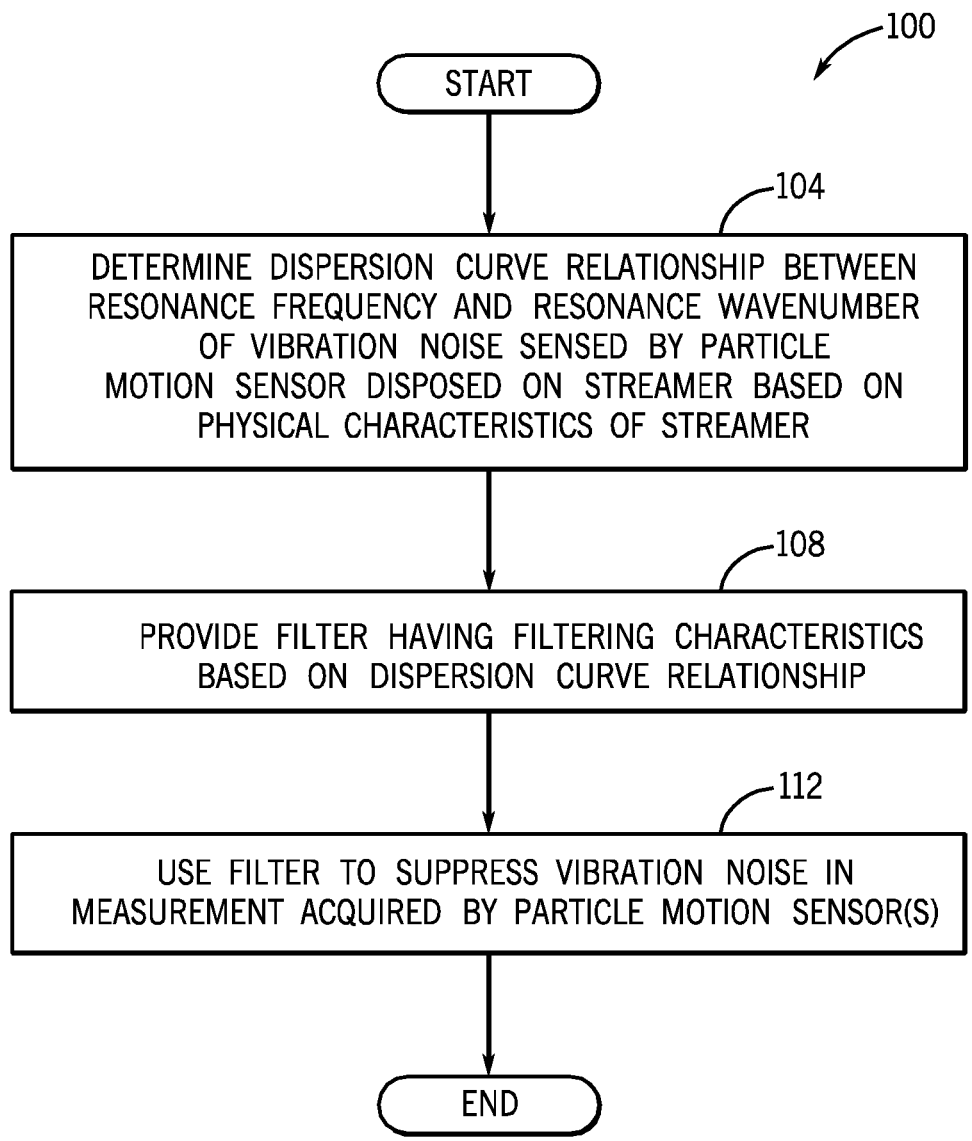
FIGS. 2, 3, 4, 5 and 6 are flow diagrams depicting techniques to use a dispersion curve for vibration modes of a streamer to suppress vibration noise in measurements acquired by sensors disposed on the streamer according to example implementations.

In accordance with systems and techniques that are disclosed herein, characteristics of the vibration noise, which are derived from the physical characteristics of the streamer 30, are used to design a filter for purposes of suppressing vibration noise that is present in measurements that are acquired by the particle motion sensors. In this manner, in accordance with example implementations, a dispersion curve that describes vibration modes of the streamer is used to suppress sensor-acquired vibration noise. Referring to FIG. 2, in accordance with example implementations, a towed seismic measurement data processing technique 100 includes determining (block 104) a dispersion curve relationship between the resonance frequency and the resonance wavenumber of vibration noise that is sensed by a particle motion sensor that is disposed on a streamer based on physical characteristics of the streamer. According to the technique 100, a filter is provided (block 108), which has filtering characteristics that are designed based on the dispersion curve relationship. The filter is used, as disclosed herein, to suppress the vibration noise that is present in the measurement that is acquired by the particle motion sensor, pursuant to block 112.

Turning now to more specific details, in accordance with example implementations, the vibration noise modes of a given streamer 30 have their energies concentrated around their corresponding resonance frequencies and resonance wavenumbers. In the following discussion, for longitudinal vibrations, the resonance frequency and resonance wavenumber are represented by "$f_L$" and "$k_L$," respectively; the resonance frequency and the resonance wavenumber for transverse vibrations are represented by "$f_T$" and "$k_T$," respectively; and the resonance frequency and the resonance wavenumber for the angular, or torsional, vibrations are represented by "$f_A$" and "$k_A$," respectively.

The mechanical properties of the streamer 30, being a cable, determine the relationship between the resonance frequencies and wavenumbers, as set forth below:

$$v_L = k_L/f_L = \sqrt{E_L A/m}, \qquad \text{Eq. 1}$$

$$v_T(f_T) = k_T/f_T = \sqrt{\frac{-T + \sqrt{T^2 + 4E_T I \pi^3 d^2 \rho f_T^2}}{8EI\pi^2 f_T^2}}, \qquad \text{Eq. 2}$$

and $$v_A = k_A/f_A = \sqrt{\frac{\rho}{G}}, \qquad \text{Eq. 3}$$

where "$v_L$," "$v_T$," and "$v_A$" are the phase velocities (in meters per second (m/s)) for the longitudinal, transverse and angular vibration noises, respectively; "$E_L$" and "$E_T$" represent the Young's modulus (in Pascals (Pa)); "A" represents cross-sectional area of the streamer 30 (in meters square ($m^2$)); "m" represents the mass per unit length; "I" represents the area moment of inertia (in $m^4$); "T" represents the axial tension in Newtons (N); "$\rho$" represents the density of sea water (in kilograms per cubic meters ($kg/m^3$)) modified to account for the added mass effect as the towed streamer moves some volume of fluid with it; and "G" represents the shear modulus of elasticity (in Pa).

For a fluid-filled or gel-filled streamer 30, the $E_T$ Young's modulus may be assumed to be zero, which results in a constant phase velocity, as described below:

$$v_T = \frac{2}{d}\sqrt{\frac{T}{\pi\rho}}. \qquad \text{Eq. 4}$$

It is noted that depending on the alignment of the particle motion sensor with respect to the axes of the streamer 30, one or more of the vibration terms that are set forth in Eqs. 1-3 above may be negligible. For example, a particle motion sensor that is aligned with the longitudinal streamer axis is not sensitive to transverse and angular vibrations. As another example, a particle motion sensor that is normal to the longitudinal streamer axis is not sensitive to longitudinal vibrations.

For clarity, examples are disclosed herein for purposes of suppressing transverse components of vibration noise, i.e., crossline or vertical components of vibration noise acquired by crossline-oriented or vertically-oriented particle motion sensors. It is understood, however, that the techniques and systems that are disclosed herein may likewise be applied to suppressing inline components of vibration noise. Thus, many variations are contemplated, which are within the scope of the appended claims.

It is further assumed in the following discussion that the mechanical properties of the streamer 30 are known so that Eqs. 1-4 may be applied for purposes of determining the dispersion curve of the vibration modes of the streamer 30. Appropriate estimations may be made for one or more of these properties, in accordance with some implementations, as can be appreciated by the skilled artisan.

In general, a measurement (called "m(t,x)" herein) that is acquired by a transversely-oriented particle motion sensor (a crossline-oriented or vertically-oriented particle motion sensor, for example) may be represented as a combination of a seismic signal (called "s(t,x)" herein); a transverse vibration noise (herein called "tvn(t,x)"); an angular, or torsional, vibration noise (herein called "avn(t,x)"); and an incoherent noise (herein called "n(t,x)"), as described below:

$$m(t,x)=s(t,x)+tvn(t,x)+avn(t,x)+n(t,x). \qquad \text{Eq. 5}$$

The frequency-wavenumber (f-k) transformation of the m(t,x) measurement may be represented as the superposition of the f-k transforms of the individual signal and noise terms, as set forth below:

$$m(f,k)=S(f,k)+TVN(f,k)+AVN(f,k)+N(f,k), \qquad \text{Eq. 6}$$

where "f" represents frequency; and "k" represents the inline wavenumber. The capital letters in Eq. 6 are used to represent the transformed components. Thus, for example, "TVN(f,k)" represents the transformed tvn(t,x) vibration noise.

The vibration noise energy is concentrated around the corresponding resonance frequency and wavenumbers, as set forth below:

$$TVN(f,k)\cong 0, \text{ for } |k-f/v_T(f)|>\alpha, \text{ and} \qquad \text{Eq. 7}$$

$$AVN(f,k)\cong 0, \text{ for } |k-f/v_A|>\beta, \qquad \text{Eq. 8}$$

where "$\alpha$" and "$\beta$" are relatively small numbers relative to the Nyquist wavenumber and are proportional to the respective coherence lengths.

In accordance with an example implementation, the suppression of the vibration using the dispersion curve relationship may be performed in the frequency-spatial (f-x) domain. In this manner, the f-x transform of the m(t,x) measurement may be performed, as set forth below:

$$M(f,x)=\int_{-\infty}^{\infty}m(t,x)e^{-j2\pi ft}dt. \qquad \text{Eq. 9}$$

In the f-x domain, a portion of the transverse vibration noise (or angular vibration noise) may be estimated by a process that includes (in the following order): 1.) demodulation; 2.) low pass filtering; and 3.) modulation.

More specifically, the process includes first demodulating the M(f,x) transformed measurement which means multiplying data at frequency f with a complex exponential $e^{-j2\pi f/v_T(f)x}$, as described below:

$$Y_{1+}(f,x)=M(f,x)e^{-j2\pi f/v_T(f)x}, \qquad \text{Eq. 10}$$

where "$Y_{1+}(f,x)$" represents the demodulated transformed M(f,x) measurement assuming the vibration noise propagates in a direction toward the front of the streamer 30. The case for the vibration noise propagating toward the rear of the streamer 30 is addressed further below.

In general, the effect of the demodulation of the frequency slices in space is to translate the energy around the frequency-wavenumber dispersion curve $(f_T,k_T)=(f,f/v_T(f))$ to zero wavenumber. In other words, the energy around zero wavenumber in the $Y_1(f,x)$ corresponds to the energy around the dispersion curve $(f_T,k_T)=(f,f/v_T(f))$ in the data M(f,x).

Next, with the transverse vibration noise energy being centered around zero wavenumber, a low pass filter is applied for purposes of removing energy that is not part of the transverse vibration noise. In other words, energy other than that around the dispersion curve in the original data is removed by the low pass filtering. The low pass filtering operation may be, for example, performed using convolution in space, as described below:

$$Y_{2+}(f,x) = \int_{-\infty}^{\infty} Y_{1+}(f,x')h_\alpha(x-x')dx', \quad \text{Eq. 11}$$

where "$h_\alpha(x)$" represents a low pass filter that has a cutoff wavenumber of "$\alpha/2$.".

Next, the demodulated and filtered energy content is translated, or mapped, to the correct wavenumbers, i.e., mapped back to the vibration noise resonance wavenumber of the dispersion curve. For this purpose, the filtered data at frequency f is multiplied with the complex exponential $e^{j2\pi f/v_T(f)x}$, as set forth below:

$$TVN_+(f,x)Y_2(f,x)e^{j2\pi f/v_T(f)x}. \quad \text{Eq. 12}$$

The effect of the modulation of the frequency slices in space is to translate the energy around zero wavenumber to the frequency-wavenumber dispersion curve $(f_T,k_T)=(f,f/v_T(f))$. The subscript "+" signifies that the extracted transverse vibration noise component corresponds to the vibration energy around the resonance frequency and wavenumbers $(f_T,k_T)=(f,f/v_T(f))$. In other words, the subscript "+" represents that the operation is performed assuming that the vibration noise propagates in a direction toward the front (for this example) end of the streamer 30.

A similar procedure may be used to the differenced signal $M(f,x)-TVN_+(f,x)$ to extract the transverse vibration noise component, which corresponds to vibration energy around the resonance frequency and wavenumbers $(f_T,k_T)=(-f,-f/v_T(f))$, i.e., for vibration noise propagating toward the rear end of the streamer 30, as described below:

$$Y_{1-}(f,x) = [M(f,x) - TVN_+(f,x)]e^{-j2\pi f/v_T(f)x}, \quad \text{Eq. 13}$$

$$Y_{2-}(f,x) = \int_{-\infty}^{\infty} Y_{1-}(f,x')h_\alpha(x-x')dx', \text{ and} \quad \text{Eq. 14}$$

$$TVN_-(f,x) = Y_{2-}(f,x)e^{-j2\pi f/v_T(f)x}. \quad \text{Eq. 15}$$

Using Eqs. 12 and 15, the estimate of the transverse vibration noise may be determined by superposing of the vibration noise terms with resonance frequencies (i.e., $(f_T,k_T)=(f,f/v_T(f))$ and $(f_T,k_T)=(-f,-f/v_T(f))$), as set forth below:

$$TVN(f,x) = TVN_+(f,x) + TVN_-(f,x), \quad \text{Eq. 16}$$

By using an inverse Fourier transformation, the vibration data may then be converted to time-space domain, as set forth below:

$$tvn(t,x) = \int_{-\infty}^{\infty} TVN(f,x)e^{j2\pi ft}dt, \quad \text{Eq. 17}$$

The tnv(t,x) transverse noise may then be subtracted from the acquired particle motion data for purposes of suppressing the transverse vibration noise It is noted that the techniques that are set forth above may likewise be applied to suppress torsional or inline vibration noise, in accordance with some implementations.

Figure 3:
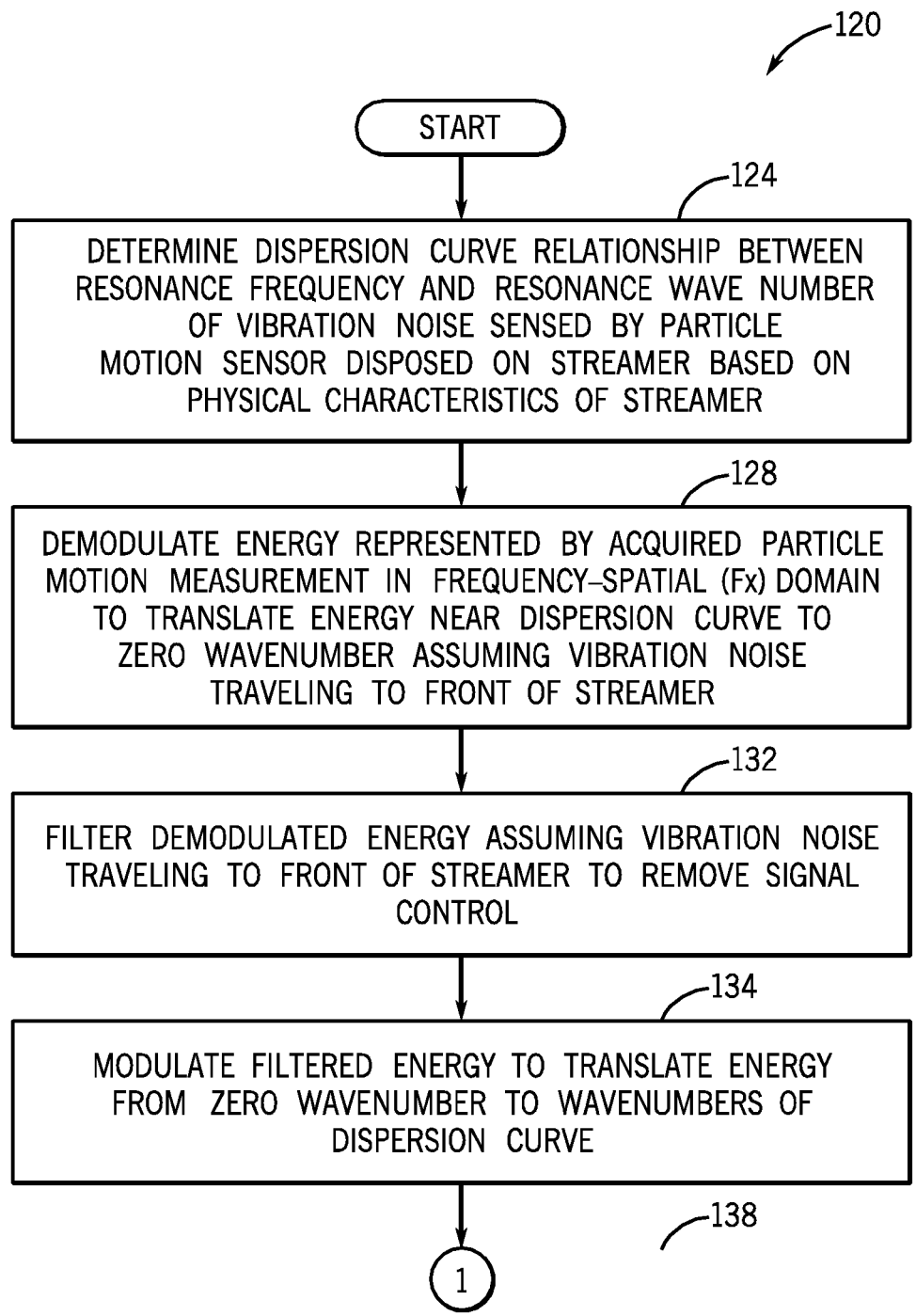

Thus, referring to FIG. 3, in accordance with an example implementation, a technique 120 includes determining a dispersion curve relationship between a resonance frequency and a resonance wavenumber of vibration noise sensed by a particle motion sensor that is disposed on a streamer based on physical characteristics of the streamer, pursuant to block 124. The energy that is represented by the acquired particle motion measurement is then demodulated, pursuant to block 128, in the f-x domain to translate energy near the dispersion curve to zero wavenumber, assuming vibration noise is traveling to the front of the streamer. Next, pursuant to block 132, the demodulated energy is filtered (block 132) assuming the vibration noise is traveling to the front of the streamer. The modulated and filtered energy is then translated from zero wavenumber to wavenumbers of the dispersion curve, pursuant to block 134. This modulated and filtered energy may then be removed from the energy represented by the particle motion measurement to suppress vibration noise.

Figure 4:
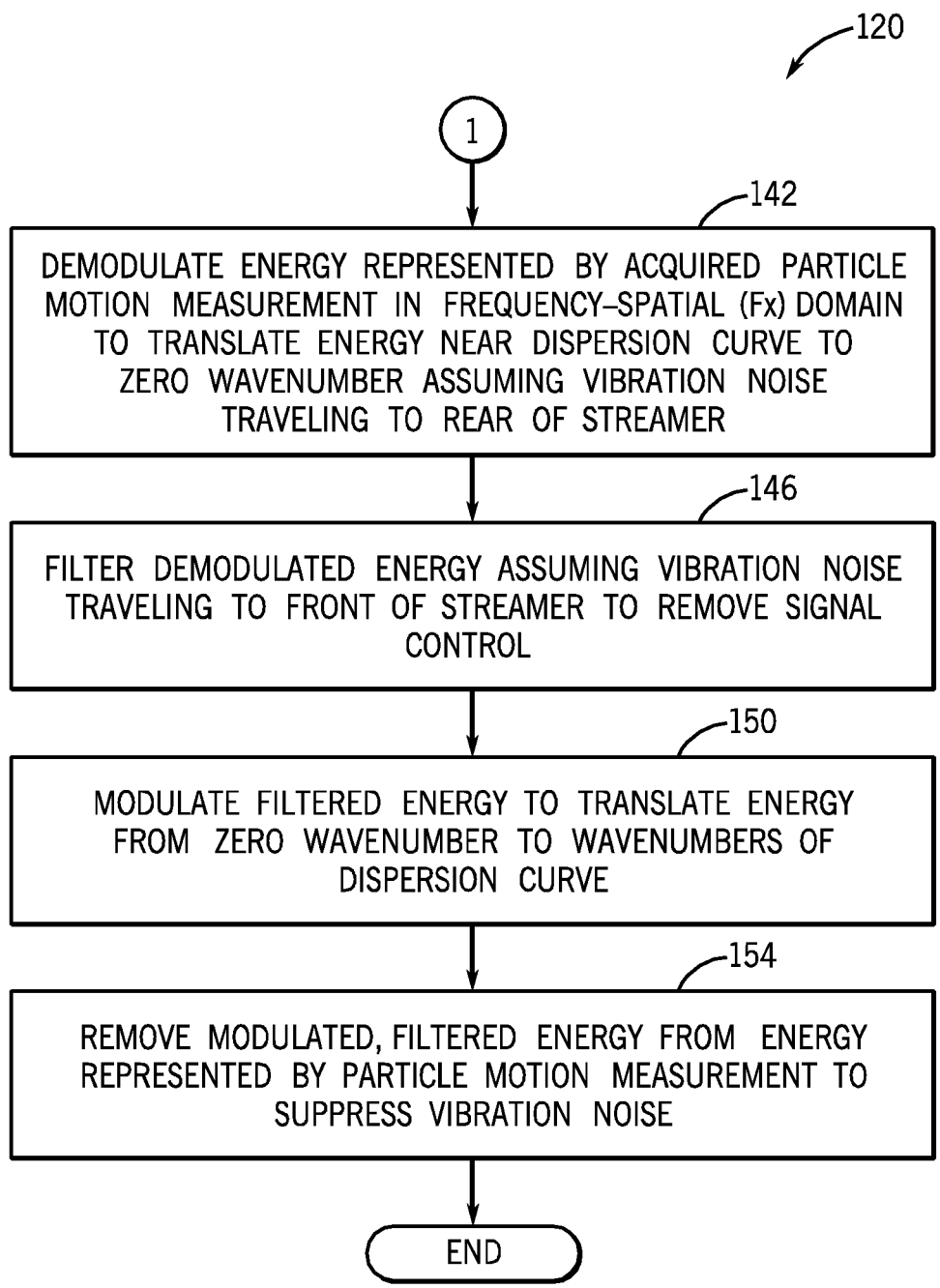

Referring to FIG. 4, the technique 120 further includes demodulating (block 142) energy represented by the acquired particle motion measurement in the f-x domain to translate energy near the dispersion curve to zero wavenumber assuming that the vibration noise is traveling toward the rear of the streamer. Thus, the demodulated energy may be filtered, pursuant to block 132, assuming that the vibration noise travels to the rear of the streamer; and then, the filtered demodulated energy is modulated to a translate energy from the zero wavenumber to wavenumbers of the dispersion curve, pursuant to block 146. The modulated and filtered energy may then be removed from the energy represented by the particle motion measurement for purposes of suppressing vibration noise, pursuant to block 154.

In accordance with a further implementation, a frequency-wavenumber (f-k) filter may be constructed with a passband to extract the transverse vibration noise without the above-described modulation and demodulation. In this manner, in accordance with another example implementation, a frequency-wavenumber (f-k) filter may be constructed with the following pass band and stop band:

$$H(f,k) = \begin{cases} 1, & \text{for } |k - f/v_T(f)| < \alpha \\ 0, & \text{otherwise} \end{cases}, \quad \text{Eq. 18}$$

Using the H(f,k) filter, the transverse vibration noise may be estimated by applying the H(f,k) filter in the Fourier transform domain, as described below:

$$M(f,k) = \int_{-\infty}^{\infty} m(t,x)e^{-j2\pi(ft+kx)}dtdx, \quad \text{Eq. 19}$$

$$TVN(f,k) = M(f,k)H(f,k), \text{ and} \quad \text{Eq. 20}$$

$$tvn(t,x) = \int_{-\infty}^{\infty} m(t,x)e^{j2\pi(ft+kx)}dtdx. \quad \text{Eq. 21}$$

In accordance with example implementations, a smooth transition between the pass and stop bands of the H(f,k) filter may be used to avoid Fourier transform artifacts.

Figure 5:
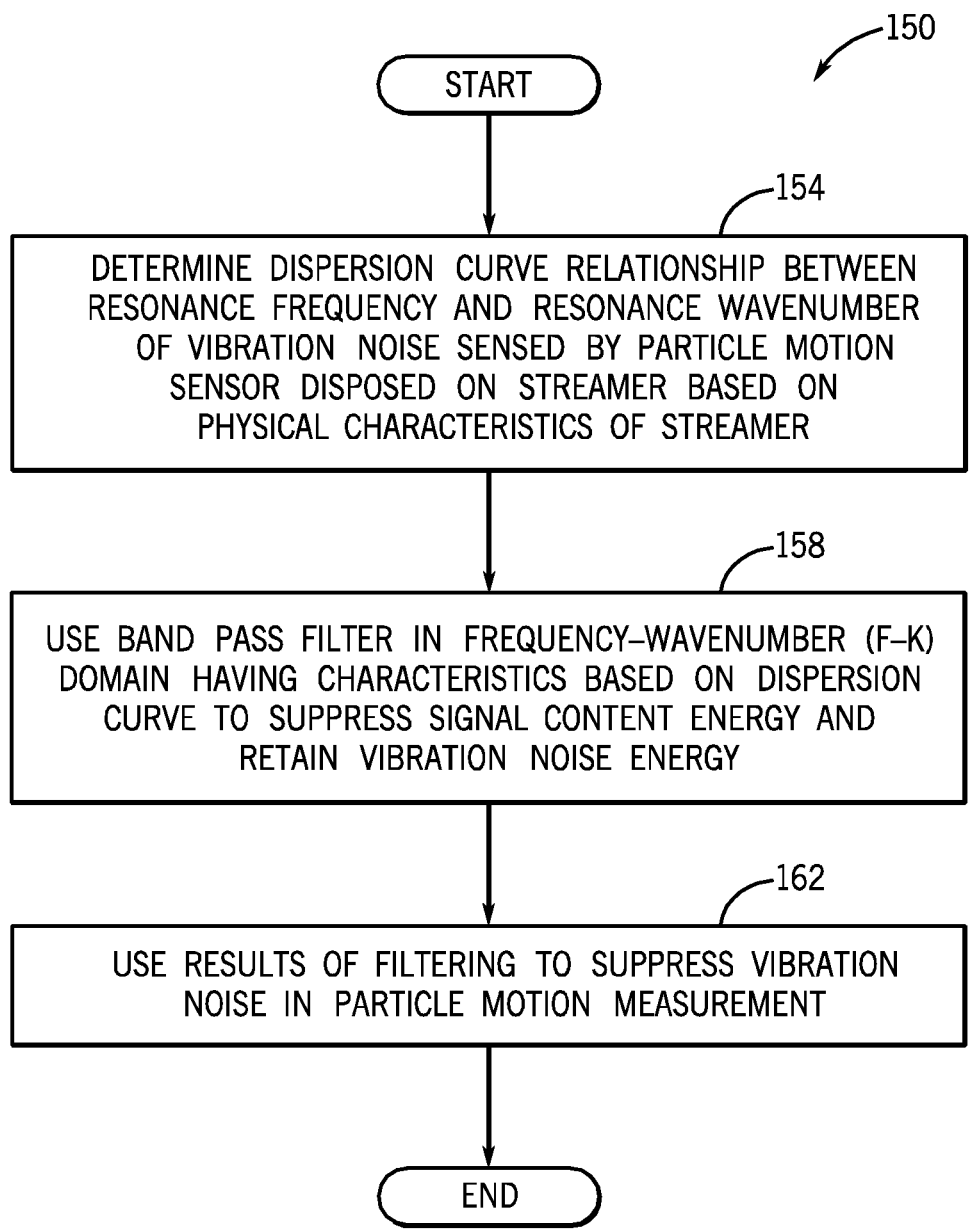

Thus, referring to FIG. 5, in accordance with example implementations, a technique 150 includes determining (block 154) a dispersion curve relationship between a resonance frequency and a resonance wavenumber of vibration noise sensed by a particular motion sensor disposed on a streamer based on physical characteristics of the streamer. The filter is then used, pursuant to block 158, to filter in the f-k domain based on the dispersion curve to suppress signal content energy represented by the particle motion measurement and retained vibration noise energy. The results of the filtering are then used to suppress vibration noise in the particle motion measurement, pursuant to block 162.

In yet another variation, in accordance with a further example implementation, the dispersion curve may be used to construct a time-spatial (t–x) filter (called "h(t,x)" herein), whose Fourier transformation approximates the f–k response of the filter. As an example, a filter that is disclosed in the following reference may be used: Ç etin, A. E., Ö. N. Gerek, and Y. Yardimci, EQUIRIPPLE FIR FILTER DESIGN BY THE FFT ALGORITHM, IEEE Signal Processing Magazine, 60-64 (1997). After design of the t–x filter, the vibration noise may be estimated using convolution in time and space, as set forth below:

$$tvn(t,x) = \int_{-\infty}^{-\infty} \int_{-\infty}^{-\infty} m(t',x')h(t-t',x-x')dt'dx'. \quad \text{Eq. 22}$$

Figure 6:
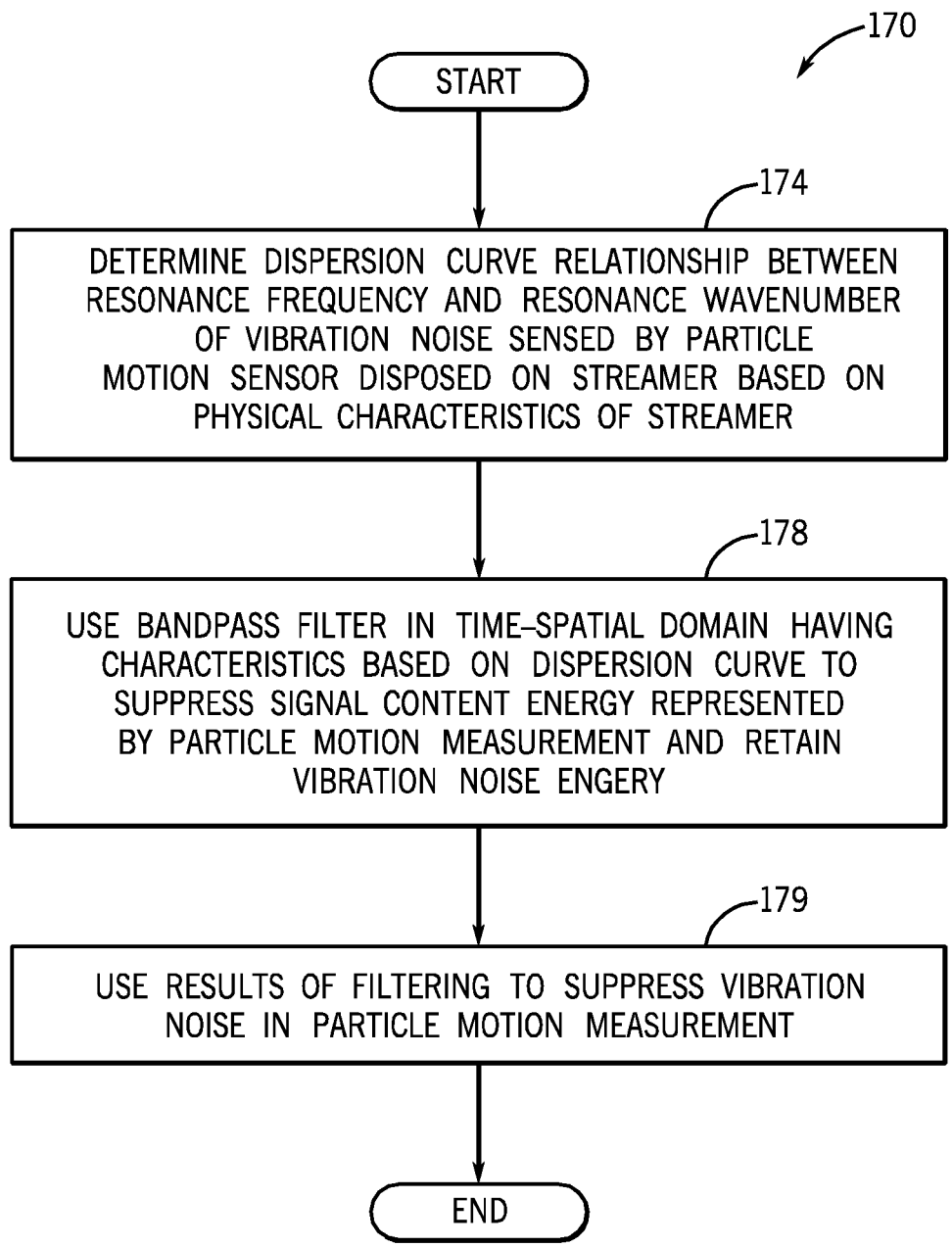

Thus, referring to FIG. 6, in accordance with an example implementation, a technique 170 includes determining a dispersion curve relationship between a resonance frequency and a resonance wavenumber of vibration noise sensed by a particle motion sensor disposed on a streamer based on physical characteristics of the streamer, pursuant to block 174. A time-spatial domain band pass filter is then used, pursuant to block 178, which is constructed based on the dispersion curve to suppress signal content energy represented by the particle motion measurement and retain vibration noise energy. The results of the filtering are then used to suppress vibration noise in the particle motion measurement, pursuant to block 179.

Figure 7:
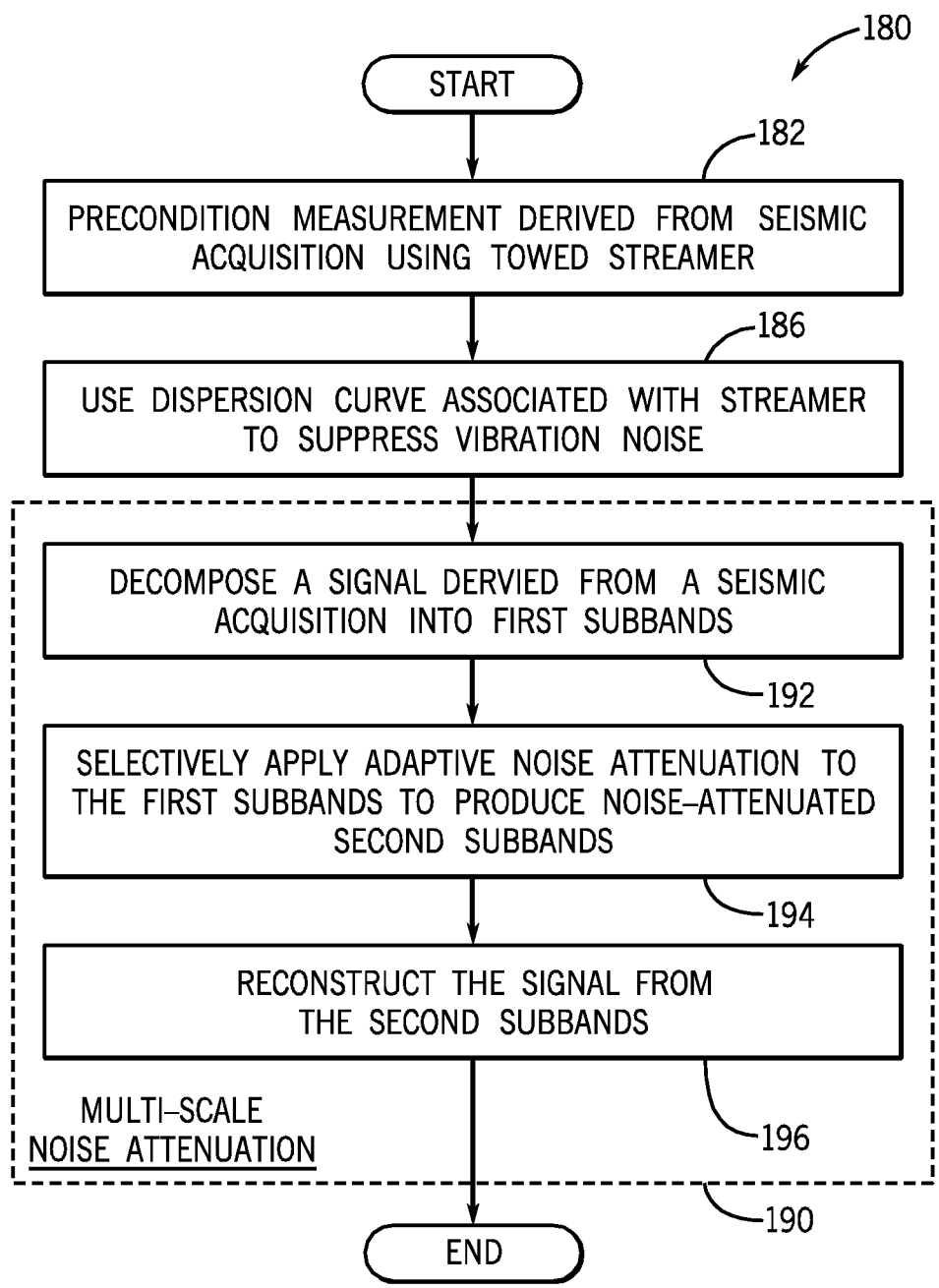
FIG. 7 is a flow diagram depicting a multiple scale noise attenuation technique that uses a dispersion curve-based vibration noise filtering and multiple scale noise attenuation to suppress noise acquired by towed sensors according to an example implementation.

In accordance with example implementations, any of the above-described techniques of suppressing vibration noise may be combined with a multi-scale noise attenuation-based technique. In this regard, referring to FIG. 7, in accordance with example implementations, a technique 180 includes preconditioning (block 182) a measurement derived from a seismic acquisition using a towed streamer. This preconditioning may include such steps as processing raw sensor measurements to identify bad traces; interpolation; rotation of sensor axes to the cable axes; inline regularization (if the sensors are irregularly spaced); and so forth. A multi-scale noise attenuation 190 may be applied after one of the above-described vibration noise suppression techniques is applied (block 86). It is noted that the multi-scale noise attenuation 190 may include an adaptive part and a fixed filtering part. The adaptive array processing algorithm used in the multi-scale noise attenuation 190 may be a dip filter, which removes any data outside of the signal cone. The dip filter may be, for example, a multi-scale dip filter or a variable-length spatial filter, as described further below. Removing the vibration noise by incision between the preconditioning 182 and the multi-scale noise attenuation 190, improves the overall noise attenuation performance of the survey system.

In accordance with example implementations, the multiple scale noise attenuation technique 190 includes decomposing (block 192) the signal produced by the dispersion curve-based filtering into subbands using a transformation, such as a Discrete Wavelet Transform (DWT). As described further below, the subbands are decimated representations of the signal for different subset frequency and wavenumber ranges. The multiple scale noise attenuation 190 further includes selectively applying (block 194) adaptive noise attenuation to the subbands to produce noise-attenuated subbands. These noise-attenuated subbands may then be used to reconstruct (block 196) a filtered version of the signal. Additionally, as further described below, in accordance with some implementations, the VLSF filtering technique may be applied during the reconstruction process for purposes of removing noise outside of a signal cone 480 (see FIG. 18).

In general, the subbands are higher scale, frequency and wavenumber components of the signal and DWTs. An operation called a Discrete Wavelet Transform (DWT) may be used to decompose the signal into the subbands. A one-dimensional (1-D) DWT provides a time-frequency representation of a time signal, by decomposing it into subband signals with low and high frequency content. Each level of the DWT corresponds to filtering a signal with a low pass filter and a high pass filter and then decimating the filtered signals. The low and high pass filters are designed as perfect reconstruction Quadrature Mirror Filters (QMFs). Mathematically, filtering and decimation operations may be described as follows:

$$L^1(n,m) = \sum_{n'} h_0(2n - n')S(n',m), \quad \text{Eq. 23}$$

and $$H^1(n,m) = \sum_{n'} h_1(2n - n')S(n',m), \quad \text{Eq. 24}$$

where "n" and "m" represents the indices of time and space samples, respectively; "S" represents the input signal; "$h_0$" and "$h_1$" represent low and high-pass filters, respectively; and "$L^1$" and "$H^1$" represent the subband signals corresponding to the lower half and higher half of the original spectrum, respectively. If the Nyquist frequency for the input signal S is $F_N$, then the subband signal $L^1$ corresponds to the relatively lower frequency band ($0-F_N/2$) of the original spectrum, whereas the subband signal $H^1$ corresponds to the relatively higher frequency band ($F_N/2-F_N$) of the original spectrum.

The decomposition doubles the sampling interval and halves the frequency content. In the following discussion, the subband signals are also referred to as the representation of the signal S at a higher scale. The scale is denoted by the superscript in the description of the subbands herein. For example, the subband signal is "scale 1" after first level of decomposition, which produces the subbands $L^1$ and $H^1$.

The decomposition may be repeated to further increase the frequency resolution. For instance, a second step of the DWT could be used to decompose, for instance, the lower subband signal $L^1$ into higher scale components in another decomposition stage that is described below:

$$L^2(n,m) = \sum_{n'} h_0(2n - n', m)L^1(n',m), \quad \text{Eq. 25}$$

and $$L^1 H^1(n,m) = \sum_{n'} h_1(2n - n', m)L^1(n',m). \quad \text{Eq. 26}$$

In this example, $L^2$ corresponds to the frequency band ($0-F_N/4$) of the original spectrum, whereas the subband signal $L^1 H^1$ corresponds to the frequency band ($F_N/4-F_N/2$) of the original spectrum.

It is noted that the signal S may be re-synthesized from subband signals $L^1$ and $H^1$ by upsampling and filtering operations, as described below:

$$S(n-d) = \sum_{n'} g_0(n-n')\overline{L}^1(n') + \sum_{n'} g_1(n-n')\overline{H}^1(n'), \quad \text{Eq. 27}$$

where "d" represents a constant delay; "$g_0$" and "$g_1$" represent low and high-pass synthesis filters, respectively; and "$\overline{L}^1$" and "$\overline{H}^1$" represent upsampled subband signals which are obtained by padding, or inserting zeros, between the samples, as described below:

$$\overline{L}^1(n) = \begin{cases} L^1(n/2), & n \text{ is even} \\ 0, & \text{otherwise} \end{cases}, \quad \text{Eq. 28}$$

and $$\overline{H}^1(n) = \begin{cases} H^1(n/2), & n \text{ is even} \\ 0, & \text{otherwise} \end{cases}. \quad \text{Eq. 29}$$

The 2-D DWT may be obtained by first applying the 1-D DWT in time, as described below:

$$L^4(n, m) = \sum_m h_0(2n - n', m) L^3(n', m), \quad \text{Eq. 30}$$

$$L^3 H^1(n, m) = \sum_m h_1(2n - n', m) L^3(n', m), \quad \text{Eq. 31}$$

Next, the 1-D DWT is applied in space, as described below:

$$L^4\_L^1(n, m) = \sum_{m'} h_0(n, 2m - m') L^4(n, m'), \quad \text{Eq. 32}$$

and $$L^4\_H^1(n, m) = \sum_{m'} h_1(n, 2m - m') L^4(n, m'), \quad \text{Eq. 33}$$

where the underscore ("_") represents that the subband has been decomposed in space.

As specific examples, if the Nyquist frequency and wavenumber for the signal S are $F_N$ and $K_N$, respectively, then the subband signals correspond to the following frequency and wavenumber bands: $L^3H^1$: the frequency band ($F_N/8$–$F_N/16$) and the wavenumber band (0–$K_N$); $L^4\_H^1$: the frequency band (0–$F_N/6$) and the wavenumber band ($K_N/2$–$K_N$); and $L^4\_L^1$: the frequency band (0–$F_N/16$) and the wavenumber band (0–$K_N/2$)

Figure 8:
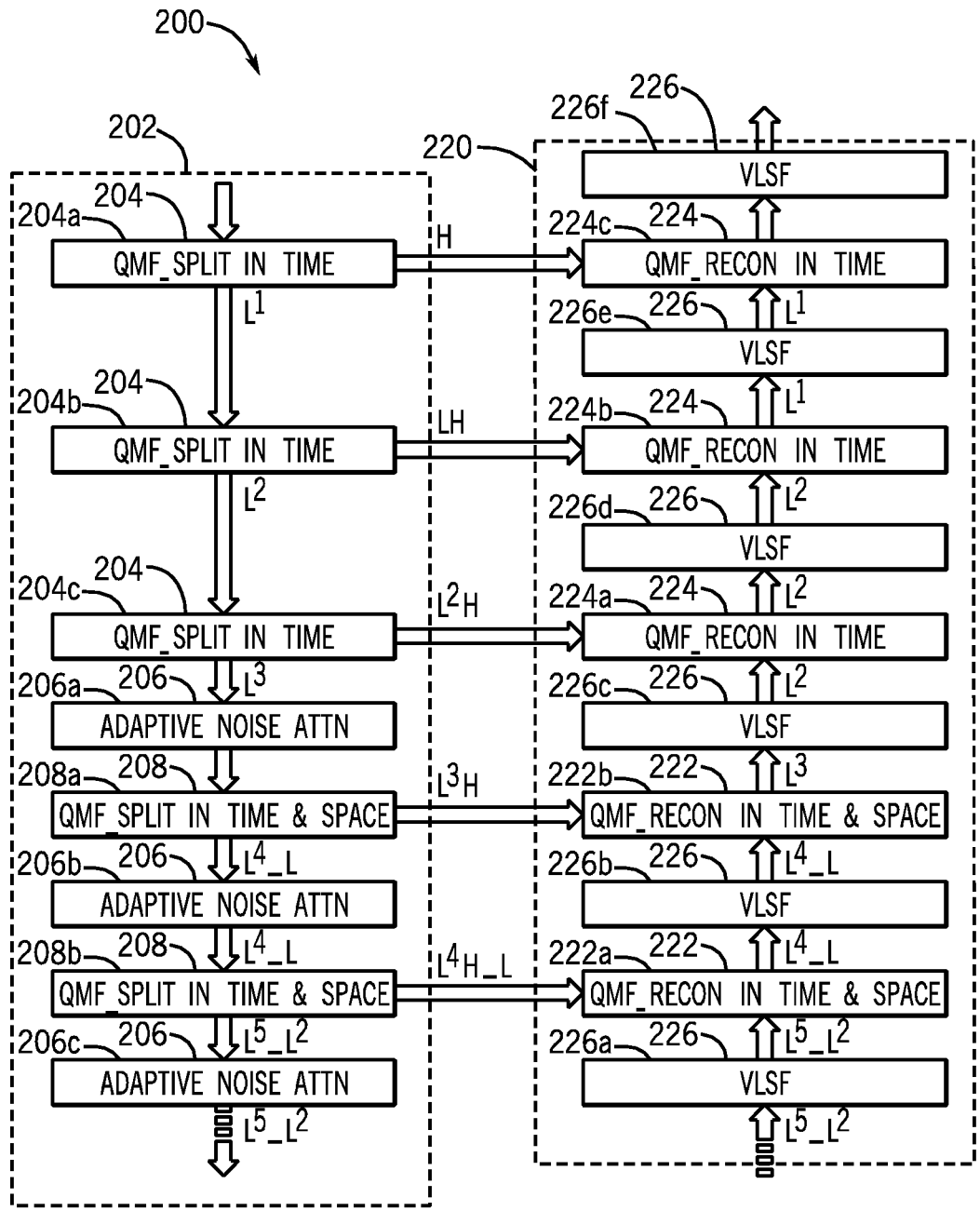
FIGS. 8, 10, 11 and 12 are flow diagrams depicting multiple scale noise attenuation techniques according to example implementations.

In accordance with implementations, the above-described decomposition may be used in a multiple scale noise attenuation technique 200 that is depicted in FIG. 8. Referring to FIG. 8, the technique 200 involves the use of decomposition stages 202 and reconstruction stages 220. For the decomposition stages 202, adaptive noise attenuation 206 is applied to decomposed subbands at different stages of the decomposition process. As specific non-limiting examples, the adaptive noise attenuation may be pursuant to a technique similar to the one disclosed in U.S. Pat. No. 6,446,008, entitled, "Adaptive Seismic Noise And Interference Attenuation Method," which issued on Sep. 3, 2002; or the technique disclosed in U.S. Pat. No. 6,651,007, entitled, "Adaptive Seismic Noise and Interference Attenuation Method," which issued on Nov. 18, 2003. The decomposition of the signal into the subbands may be performed in time (via the exemplary stages 204a, 204b and 204c); and in time and space (as depicted by exemplary stages 208a and 208b).

The decomposition occurs successively, in a stage-by-stage process. In the initial stage 204a, the original signal is decomposed into the H and $L^1$ subbands. The resulting $L^1$ subband is received by the stage 204b for further decomposition, and the H subband is furnished to one of the reconstruction stages 220. The $L^1$ subband, in turn, is received by the next decomposition stage 204b, which decomposes the $L^1$ subband into the LH subband and the $L^2$ subband. The LH subband is furnished to one of the reconstruction stages 220, and the $L^2$ subband is furnished to the next decomposition stage 204c. Stage 204c, in turn, decomposes the $L^2$ subband into an $L^3$ subband and the $L^2$H subband, which is furnished to one of the reconstruction stages 220.

As can be seen from FIG. 8, initially, the decomposition stages 202 produce more decimated and lower frequency subbands which propagate through the decomposition stages 202, ultimately resulting in the generation of the $L^3$ subband. The higher frequency subbands, which are produced in the initial decomposition, in turn, are furnished to the reconstruction stages 220.

Adaptive noise attenuation is not performed, in accordance with some implementations, until the $L^3$ subband is generated. This is due to the fact that the noise is usually weak at higher frequencies, and the adaptive noise attenuation techniques, which are usually computationally intensive, do not have much benefit at these higher frequencies. Therefore, the adaptive noise attenuation, in accordance with the example depicted in FIG. 8, begins with the $L^3$ subband and continues with the lower frequency subbands that are produced therefrom.

More specifically, a decomposition stage 206a performs adaptive noise attenuation on the $L^3$ subband and furnishes the resultant noise-attenuated subband to the next decomposition stage 208a. The decomposition stage 208a, in turn, decomposes the $L^3$ subband pursuant to time and space. In other words, the decomposition stage 208a produces a decimated lower frequency and lower wavenumber subband $L^4\_L$ subband, which is processed by the next adaptive noise attenuation stage 206b. The stage 208a also produces a higher frequency and higher wavenumber subband $L^3$H, which is furnished to one of the reconstruction stages 220. The $L^4\_L$ subband, in turn, is processed by the adaptive noise attenuation stage 206b, and the resulting noise-attenuated subband is furnished to the next decomposition stage 208b.

The above-described process may continue for several successive frequency and wavenumber decompositions, beyond the exemplary stages that are depicted in FIG. 8. Thus, further decompositions in time and space occur; and each lower frequency and lower wavenumber subband is processed by another adaptive noise attenuation stage and then, provided to another decomposition stage 208; and the higher frequency and higher wavenumber subbands produced by the decomposition are furnished to the reconstruction stages 220.

Each splitting operation reduces the data size by two in time and space. Therefore, the number of splits in time and space is limited by the record length in time than the streamer length in space. If a low number of splits is performed, the filters may have a "fuzzy" low frequency response. On the other hand, because of the relatively weak signal content at very low frequencies, the splitting may be stopped when the frequency content of the subband signal drops below 4 Hertz.

Figure 18:
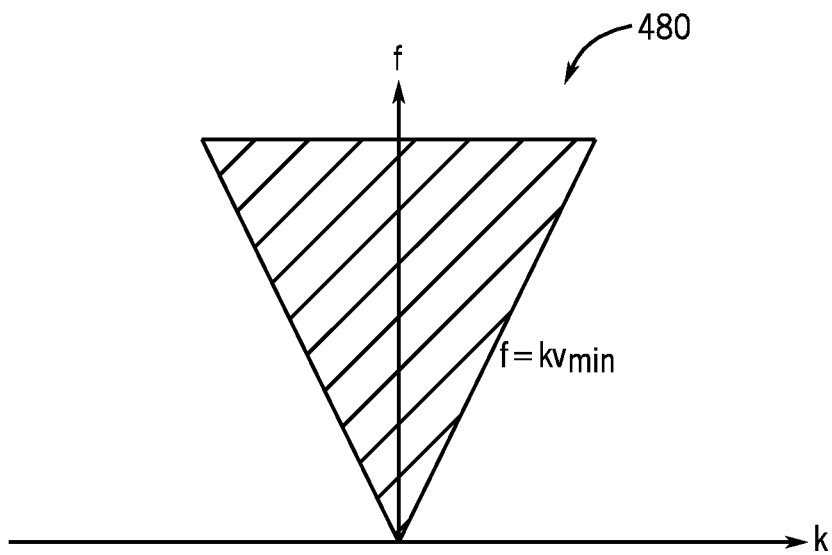
FIG. 18 is an illustration of the energy distribution of a two-dimensional seismic signal in the frequency-wavenumber domain according to an example implementation.

The reconstruction stages 220 receive the noise-attenuated subbands from the decomposition stages 202 and use these subbands to reconstruct a signal in which noise attenuation has been performed in the signal cone 480 (see FIG. 18). The reconstruction stages 220 include time and space reconstruction stages 222 (exemplary stages 222a and 222b, depicted as examples in FIG. 8) and time only reconstruction stages 224 (exemplary stages 224a, 224b and 224c, being depicted as examples), which correspond to their respective counterparts in the decomposition stages 202. The subbands provided by the decomposition stages 202 are used by the reconstruction stages 222 and 224 to reconstruct the signal.

Additionally, in accordance with some example implementations, variable length spatial filtering (VLSF) (described in more detail below) may be employed in the reconstruction. In this manner, VLSF-based filtering stages 226 (VLSF-based filtering stages 226a, 226b, 226c, 226d, 226e and 226f, being depicted as examples) may be interdispersed among the reconstruction stages 220 for purposes of attenuating noise outside of the signal cone 180. Each VLSF-based stage 226 is a low pass spatial filter, which has a filter length that is based on the frequencies of the particular subband being filtered. For example, the VLSF-based stage 226d has the filter length that is based on a frequency range associated with the $L^2$ subband, the VLSF-based stage 226b has a filtering length based on the frequency range associated with the $L^4\_L$ subband, etc.

It is noted that when 2-D QMF splitting is performed, the scales of the time and space components are increased by the same factor. With each additional split, a higher scale representation of the signal is obtained by zooming into lower frequencies and wavenumbers. Because of this property, a single adaptive algorithm prototype may be designed at one scale (a scale that corresponds to the scale of the subband $L^3$, for example) and used for signals at other scales. For example, if the adaptive noise attenuation technique that is described in U.S. Pat. No. 6,446,008 is used, the same number of time and space coefficients and the same generalized constraints may be used at every scale. Similarly, the VLSF coefficients may be designed at one stage, and the same coefficients may be used at other higher or lower stages. The larger apertures of the fixed and adaptive filters at higher scales are obtained by a larger sampling interval and spacing rather than by larger numbers of filter coefficients.

Figure 9:
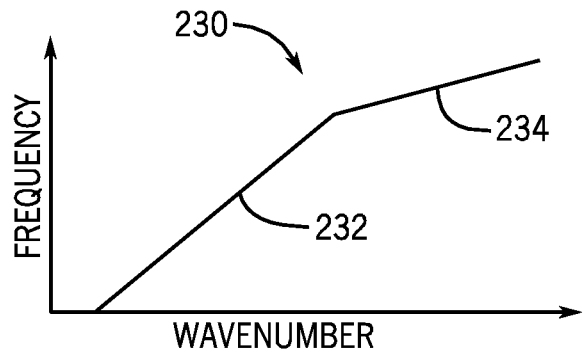
FIG. 9 is an illustration of the energy distribution of a two-dimensional seismic signal in the frequency-wavenumber domain according to an example implementation.

In accordance with some implementations, the $H_0$ and $H_1$ are FIR half band filters, which are not "perfect" low and high pass filters. Therefore, each filtering and decimation operation creates aliasing at higher frequencies. When shorter analysis filters are used, the aliased components may leak outside of the signal cone 180. For purposes of ensuring that the noise attenuation techniques do not remove an aliased component if the aliased component partially appears outside of the signal cone, the QMF synthesis filters are designed to put the aliased component back into place when the low and high frequency subband signals are synthesized into a lower scale signal. For this reason, in accordance with some implementations s, the VLSF coefficients are designed so that the frequency-wavenumber responses of the filters flare out close to the Nyquist wavenumber of the subband signal, as depicted in an exemplary plot 230 of the frequency versus wavenumber characteristic of an exemplary VLSF filter in FIG. 9. As shown, below the Nyquist wavenumber, the filter has a first portion 232 that generally follows the slope of the signal cone 180, and beyond the Nyquist wavenumber, the filter has a smaller slope 234 to ensure the capture of aliased components.

The QMF splitting and reconstruction operations may be performed by circular convolution. This usually creates artifacts on finite length data. A technique used to mitigate edge effects may include process of data to make the data circularly symmetric in time and space before the QMF splitting. For purposes of making a 2-D dataset circularly symmetric, the dataset may be extended in time and space by symmetric reflection about the last trace and time sample. It is noted that in accordance with other implementations, the above-disclosed technique of using extrapolation may be used for purposes of addressing the edge effects. In some other applications, the data may be made more circularly symmetric in time and extrapolated in space.

It is noted that with a properly selected shot window, the seismic signal may be located away from the start and end of the shot window. In that case, the circular convolution effects appear only in the noise part of the time-space plots; and therefore, the symmetric extension in time may be omitted. However, extrapolation in space may still be used to avoid edge effects due to both QMF splitting in space and the application of the VLSF filters afterwards.

Figure 10:
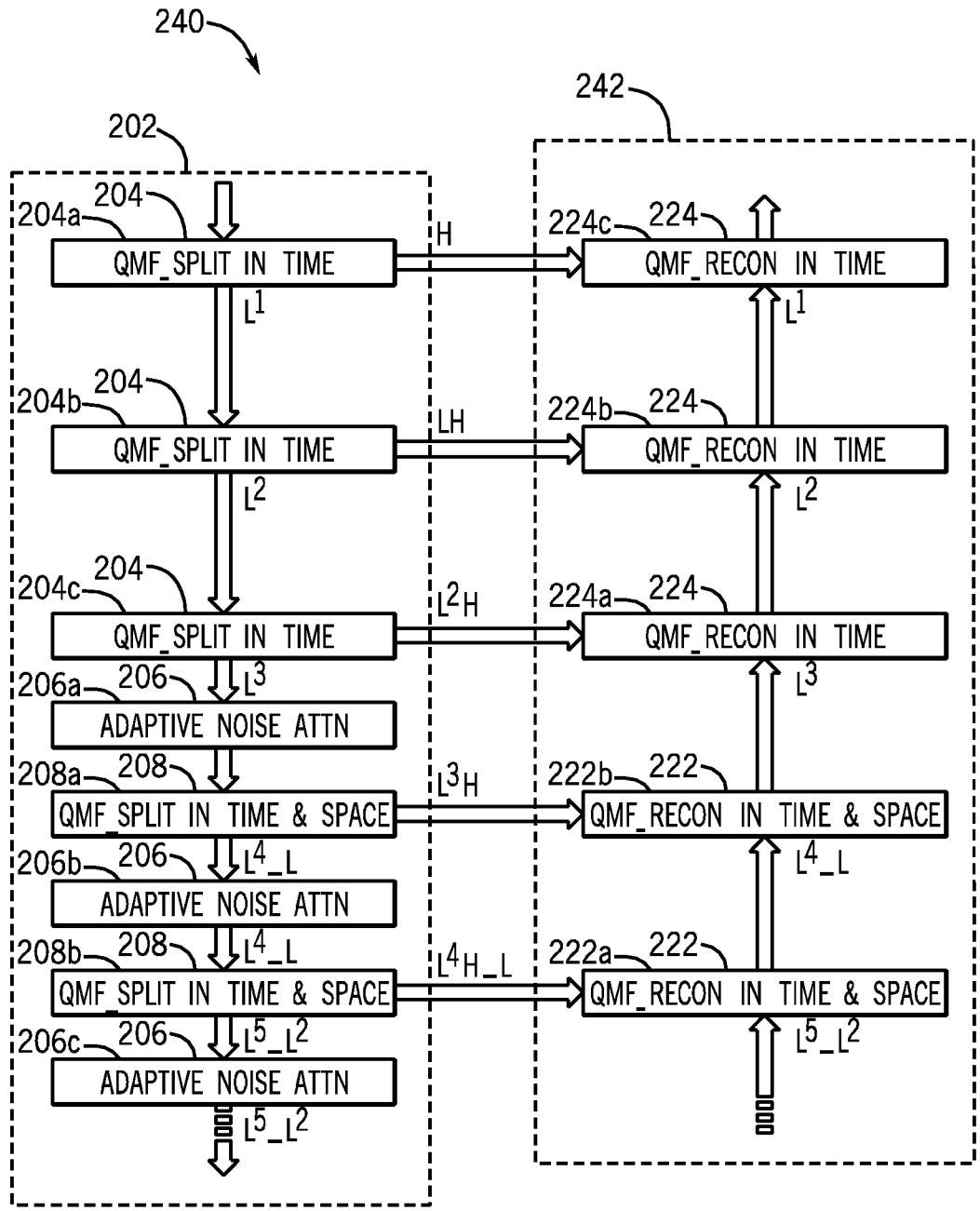

Other implementations are contemplated and are within the scope of the appended claims. For example, referring to FIG. 10, in accordance with other implementations, an alternative multiple scale noise attenuation technique 240 may be used. In general, the technique 240 is similar to the technique 200 (FIG. 8), except that the reconstruction stages 242 (which replace the reconstruction stages 220) do not employ VLSF filtering.

Figure 11:
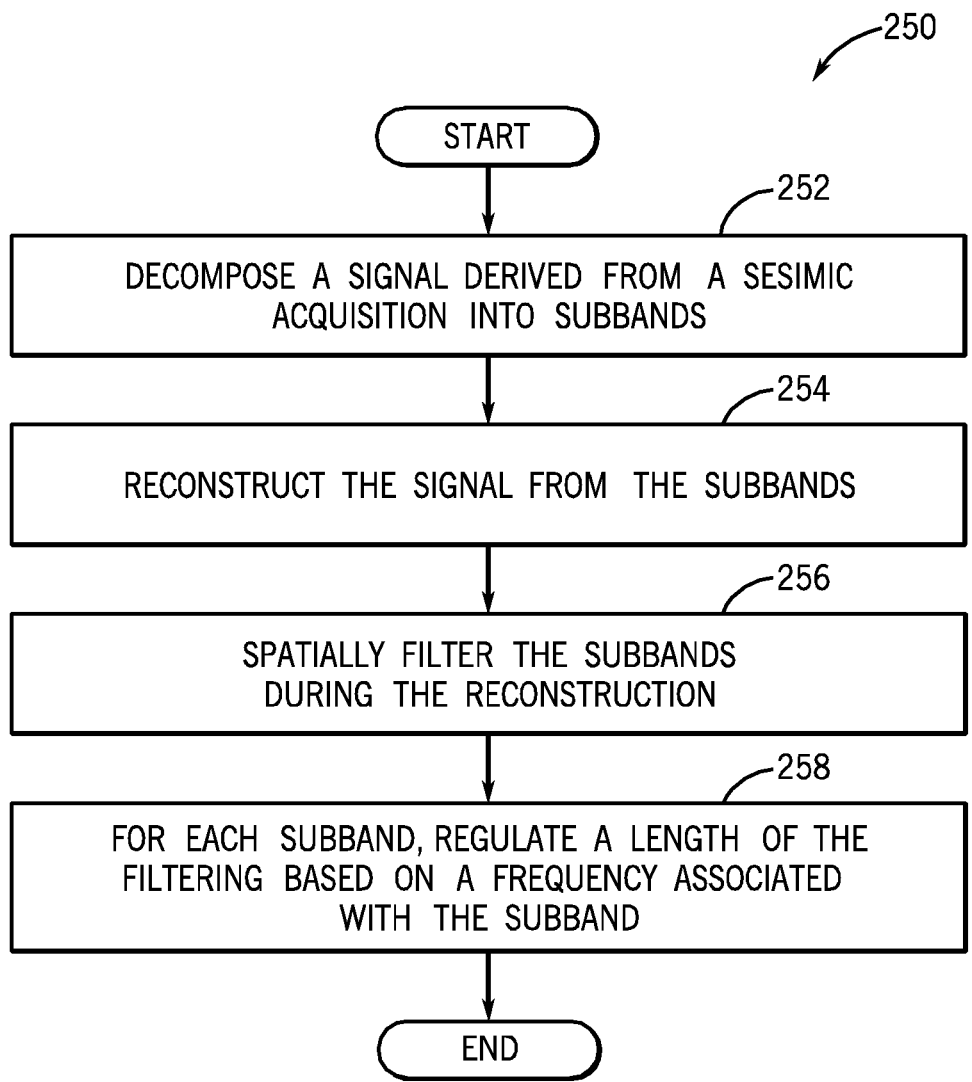

As another variation, a multiple scale noise attenuation technique 250, which is depicted in FIG. 11, may be used in accordance with other implementations. In the technique 250, adaptive noise attenuation is not performed. More specifically, pursuant to the technique 250, a signal that is derived from a seismic acquisition is decomposed into subbands, pursuant to block 252. The signal is both reconstructed (block 254) from these decomposed subbands; and the decomposed subbands are spatially filtered (pursuant to the herein disclosed VLSF filtering technique, for example), pursuant to block 256. Thus, for each subband, a length of the filtering is regulated based on a frequency associated with the subband, pursuant to block 258.

Figure 12:
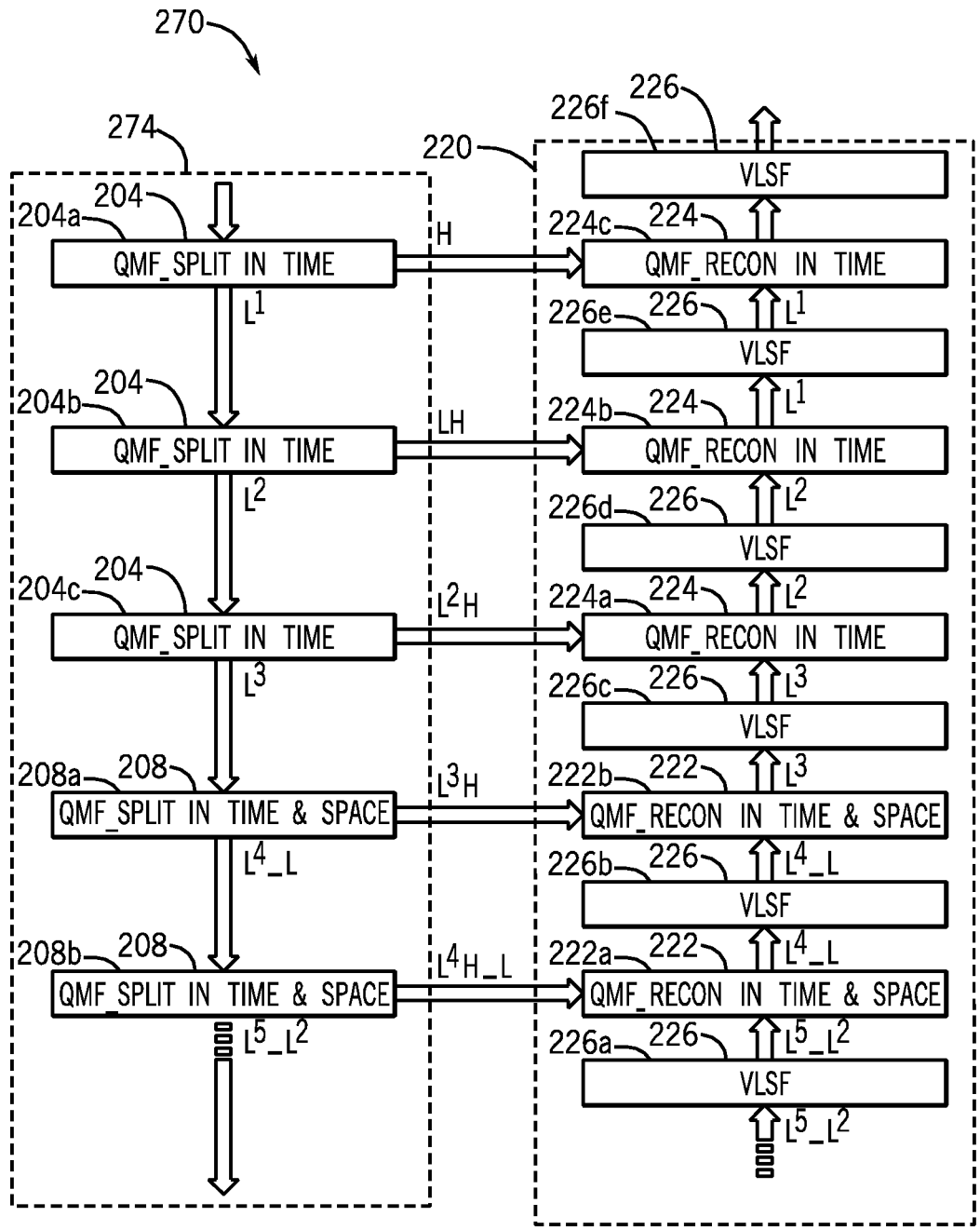

As a more specific example, a multiple scale noise attenuation technique 270 that is depicted in FIG. 12 may be used in accordance with some implementations. In general, the technique 270 is similar to the technique 200 (FIG. 8), in that the reconstruction stages 220 are the same. However, unlike the technique 200, the technique 270 includes decomposition stages 274, which replace the decomposition stages 202 and do not include the adaptive noise attenuation stages 206.

Other variations are contemplated, which are within the scope of the appended claims. For example, although a towed marine-based seismic acquisition system has been disclosed, the techniques and systems that are disclosed herein may likewise be applied to signals that are derived from other types of seismic acquisitions, such as land-based seismic acquisitions, borehole-based seismic acquisitions, seabed-based seismic acquisitions, etc.

Figure 13:
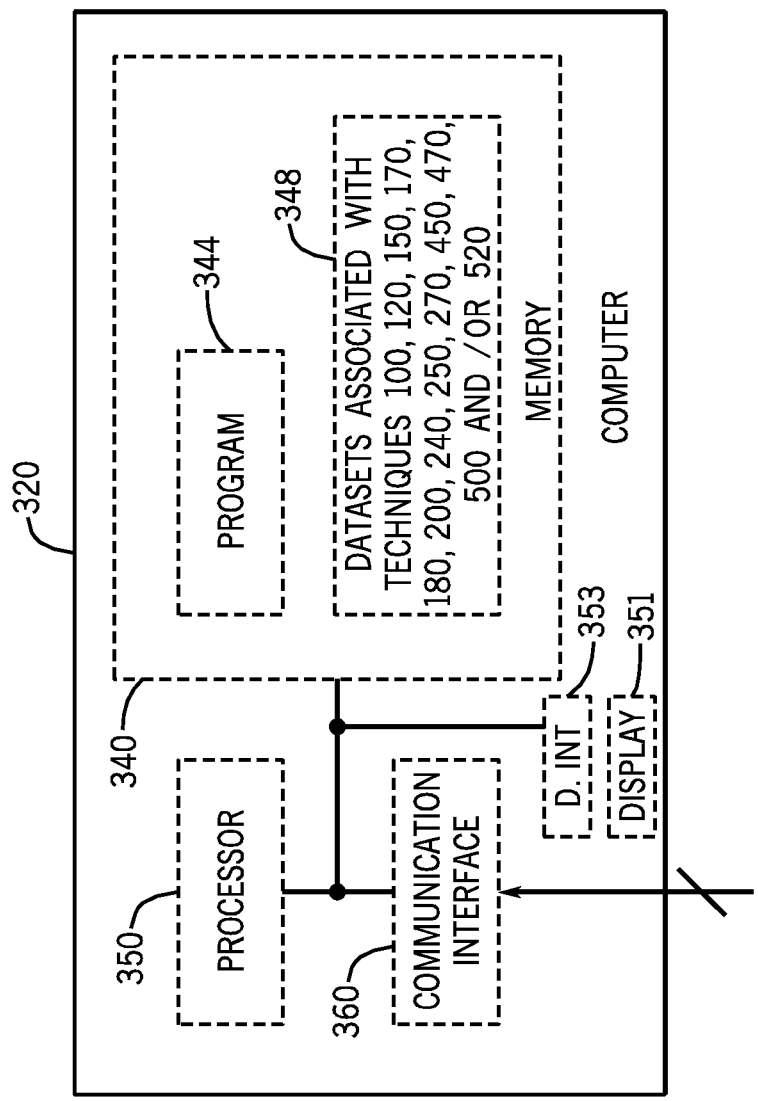
FIG. 13 is a schematic diagram of a data processing system according to an example implementation.

Referring to FIG. 13, in accordance with some implementations, a data processing system 320 may perform at least part of one or more of the techniques that are disclosed herein, such as the dispersion curve-based vibration noise suppression techniques, the multiple scale noise attenuation techniques, the sensor data preconditioning techniques, and so forth.

The system 320 may be located on one of the streamers 30, on each streamer 30, distributed among the streamers 30, on the seismic source 40, on the survey vessel 20, at a remote land-based facility, etc. The system 320 may also be distributed on one or more of these entities, in accordance with other implementations. In accordance with some implementations, the system 320 may include a processor 350, such as one or more microprocessors and/or microcontrollers.

The processor 350 may be coupled to a communication interface 360 for purposes of receiving seismic data, which are indicative of seismic measurements. In other words, the seismic data indicates signals that are derived from a seismic acquisition and have associated noise components as well as components that are indicative of pressure measurements, vertical particle motion measurements and crossline particle motion measurements, etc. In this regard, the seismic data may be indicative of the raw data received from the streamers 30, processed seismic data, etc. Regardless of its particular form, the seismic data is indicative of at least one signal that is derived from a seismic acquisition.

As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular implementation.

In accordance with some implementations, the interface 360 may be coupled to a memory 340 of the system 320 and may store, for example, various input and/or output data sets 348 involved with the techniques that are described herein. The memory 340 may store program instructions 344, which when executed by the processor 350, may cause the processor 350 to perform at least part and possibly all of one or more of the techniques that are described herein and display results obtained via the technique(s) on the display 351 of the system 320, in accordance with some implementations. As shown in FIG. 13, the system 320 may include a display interface 353 that couples the display device 351 to the system 320.

Figure 14:
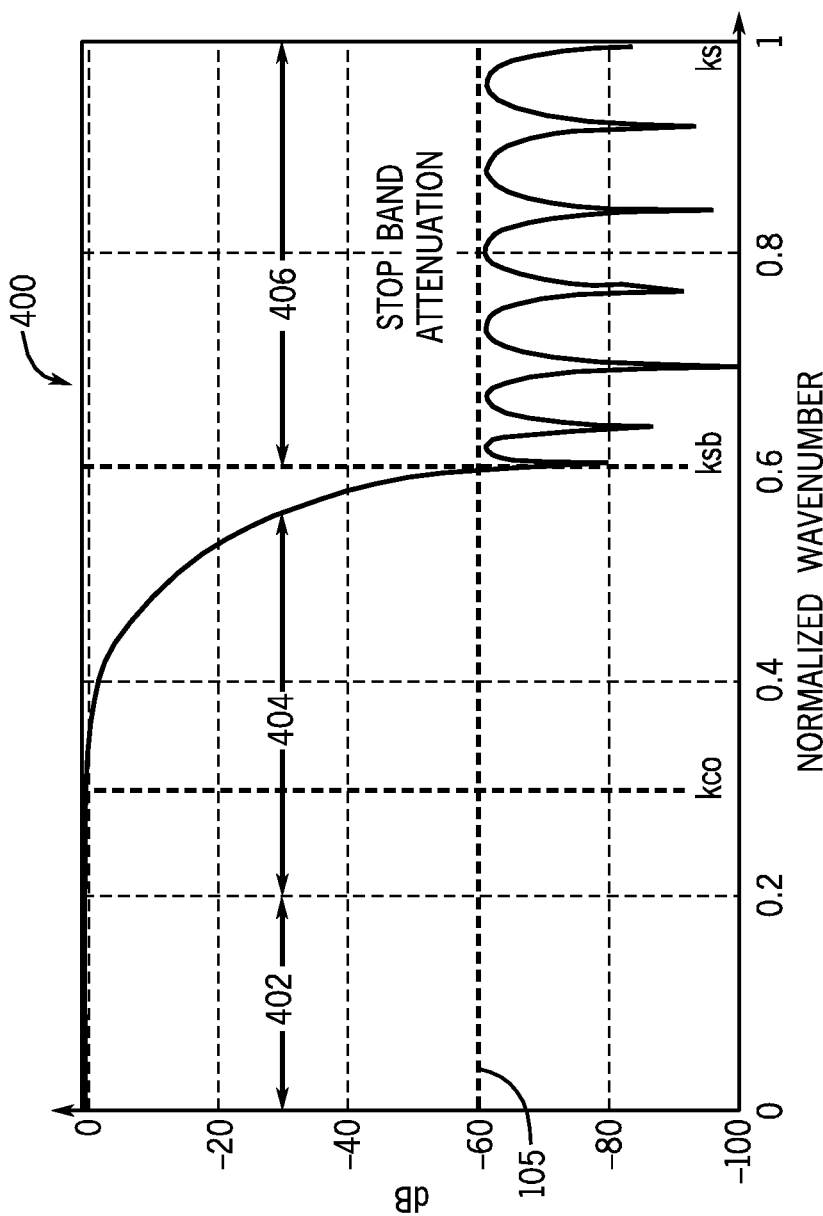
FIG. 14 is an illustration of a response of a low pass spatial filter according to an example implementation.

In accordance with an example implementation, the variable length spatial filtering (VLSF) may be performed as follows. In general, a low pass spatial filter attenuates relatively high wavenumber (short wavelength) signals and allows relatively low wavenumber (high wavelength) signals to pass through, as depicted in an exemplary low pass filter response 400 in FIG. 14. Referring to FIG. 14, in this manner, the low pass filter has a pass band 402, which allows energy that is associated with a range of relatively small wavenumbers (i.e., a range of relatively long wavelengths) to be communicated through the filter at unity or near unity gain. The pass band 402 extends from wavenumbers near zero to a cutoff wavenumber called "$k_{co}$." The filter also has a stop band 406, which extends to higher wavenumbers from a stop band wavenumber, called "$k_{sb}$." The stop band 406 has an associated stop band attenuation (SBA) 405 and attenuates energy with larger wavenumbers.

Between the pass band 402 and the stop band 406, the filter has a transition band 404, which is defined between the cutoff wavenumber $k_{co}$ and the stop band wavenumber $k_{sb}$. The sharpness of the transition band 404 is a function of the order, or length, of the filter. In this regard, a filter with a longer length can be designed to have a sharper transition (i.e., a more abrupt transition) between the stop band 406 and the pass band 402, as compared to the sharpness of the transition for a shorter length filter.

As a non-limiting example, in accordance with implementations, the low pass spatial filter may be a finite impulse response (FIR) filter. Some exemplary design techniques that may be employed to design an FIR filter include window-based methods, Fourier domain-based sampling techniques, weighted least squares techniques and an equiripple filter design technique. As a more specific example, in accordance with some implementations, the filter may be designed, in general, pursuant to an equiripple filter technique that is described in J. H. McClellan, T. W. Parks, and L. R. Rabiner, entitled "A Computer Program for Designing Optimum FIR Linear Phase Digital Filters," *IEEE Transactions on Audio Electroacoustics*, Vol. AU21, pp. 506-526 (1973). It is noted that the optimality criterion in this particular technique is the maximum deviation of the desired filter response from the actual filter response. This is often called the mini-max optimization problem in the literature, because the objective is to minimize the maximum deviation. The designed filter has equal amplitude deviation from the desired response in both the pass 402 and stop 406 bands. The relative level of the pass 402 and stop 406 band ripples may be controlled by introducing weights in the design problem. Other filter design techniques may be used, in accordance with other implementations.

Figure 15:
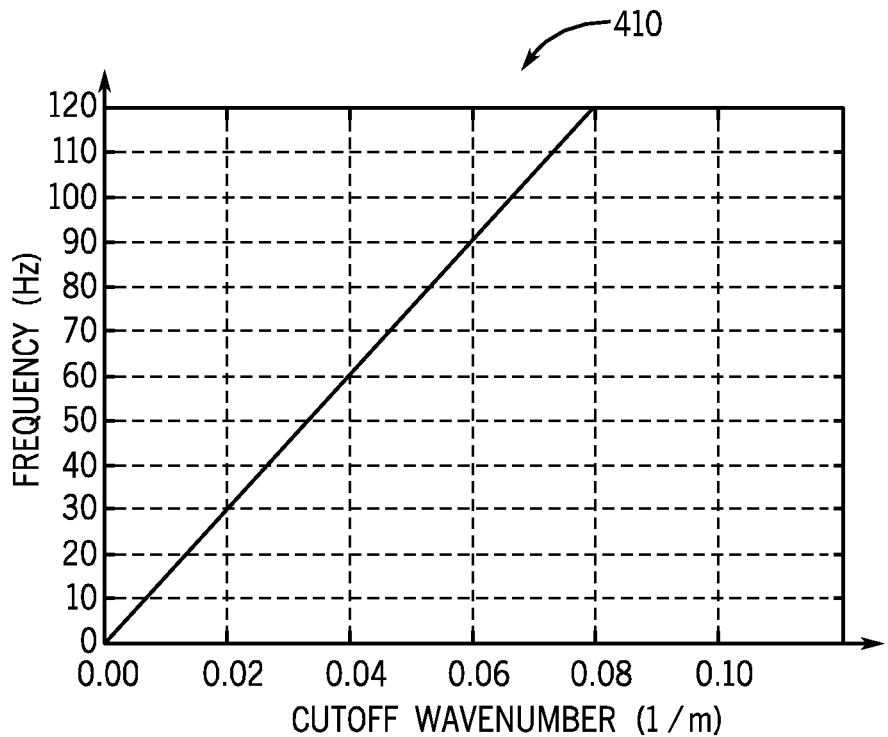
FIG. 15 is a plot representing a cutoff wavenumber of the filter of FIG. 14 as a function of frequency according to an example implementation.

For a towed marine-based seismic acquisition, the apparent velocity of the seismic data (in the common shot domain) is constrained to be within a signal cone 480, which is depicted in FIG. 18. In other words, the desired seismic signal appears inside the signal cone 480. The boundaries of the signal cone 480 are defined by the acoustic speed of sound in water. The low pass spatial filter, in accordance with implementations, may be designed to attenuate the noise outside of the signal cone 480 by selecting the cutoff wavenumber $k_{co}$ as follows:

$$k_{co}=f/v, \qquad \text{Eq. 34}$$

where "f" represents frequency; and "v" represents the acoustic speed of sound in water. Referring to FIG. 15, a plot 410 illustrates the variation of the cutoff wavenumber $k_{co}$ with frequency. In the plot 410, the acoustic speed of sound in water was chosen to be 1500 meters per second (m/s), as a non-limiting example.

Figure 16:
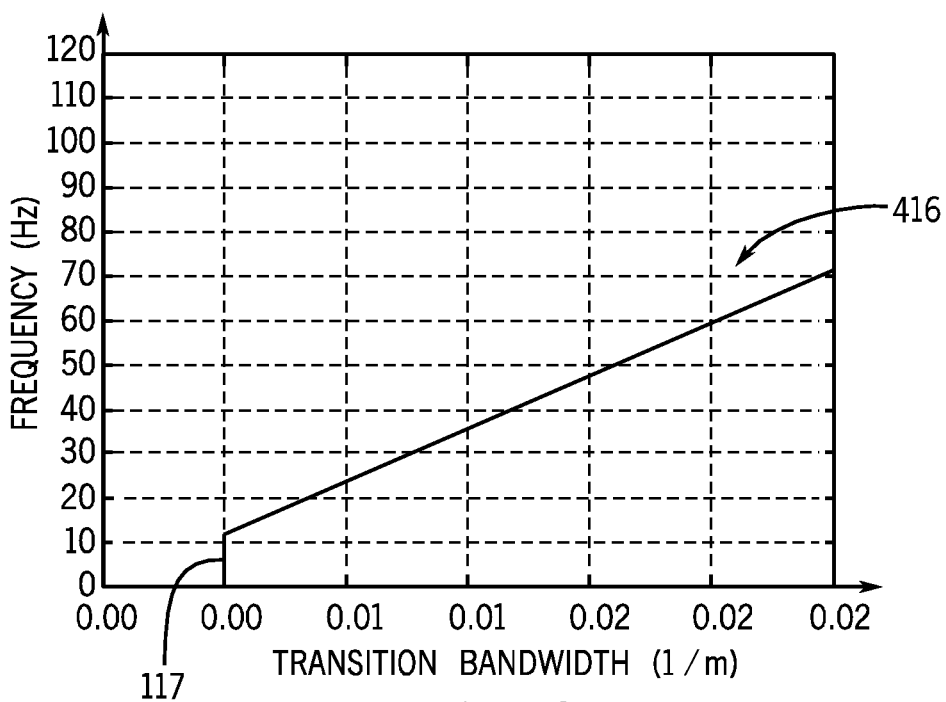
FIG. 16 is a plot of a transition bandwidth of the filter of FIG. 14 as a function of frequency according to an example implementation.

In accordance with implementations, the spatial filtering is conducted so that the order, or length (called "L" herein), of the low pass spatial filter varies as a function of the frequency being filtered, for purposes of accommodating low frequency seismic signals. Because the filter length L varies as a function of frequency, the filter may be referred to a variable length spatial filter (VLSF). As a non-limiting example, one way to construct a VLSF is to vary the transition bandwidth (TBW), which is the bandwidth of the transition band 404 (FIG. 14), proportionally to the signal frequency, as depicted in a plot 416 of the transition bandwidth TBW in FIG. 16. As depicted in FIG. 16, in accordance with some implementations, at lower frequencies, the "sharpness" of the filter is restricted by defining a minimum transition bandwidth, as indicated at reference numeral 417. It is noted that other variations are contemplated and are within the scope of the appended claims. For example, in other implementations, the transition bandwidth may be fixed, and the stop band attenuation 405 (which is depicted as being a fixed −60 dB attenuation in the non-limiting example shown in FIG. 14) may be varied.

The edge of the stop band, i.e., the stop band wavenumber $k_{sb}$, may be defined as the sum of the cutoff wavenumber $k_{co}$ and the transition bandwidth TBW, as follows:

$$k_{sb}=k_{co}+TBW. \qquad \text{Eq. 35}$$

Figure 17:
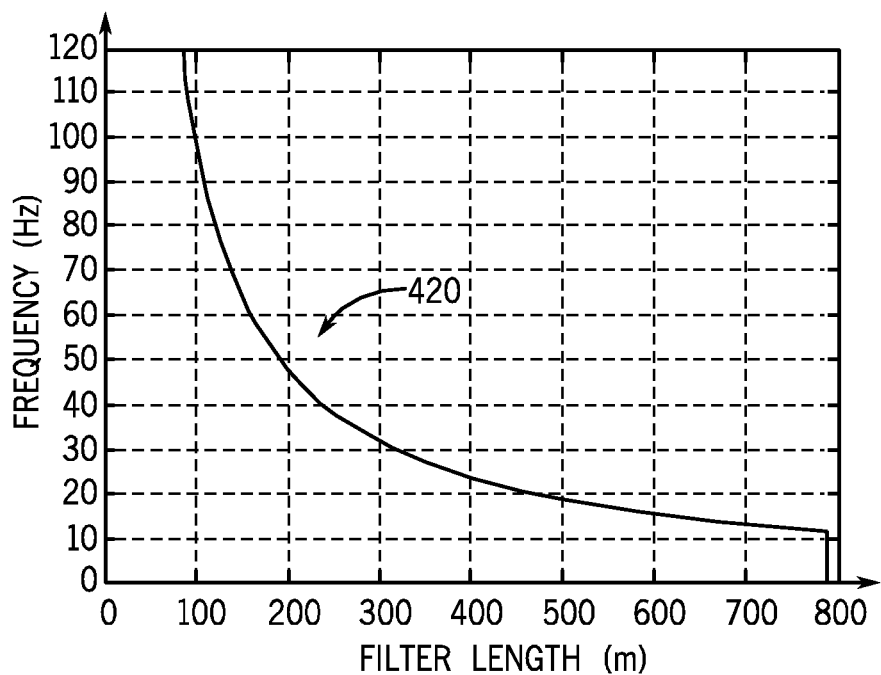
FIG. 17 is a plot of a filter length of the filter of FIG. 14 as a function of frequency according to an example implementation.

The length L of the filter, which is required to achieve the desired stop band attenuation may be described as follows:

$$L = \frac{(\ln 2 - 0.05 \times \ln 10 \times SBA)}{\pi} \frac{K_s}{TBW}, \qquad \text{Eq. 36}$$

where "SBA" represents the stop band attenuation in decibels. Given the variation in the transition bandwidth TWB with frequency, as illustrated by the plot 416 of FIG. 16, the L filter length also varies with frequency, as illustrated by a plot 420 in FIG. 17.

Figure 19:
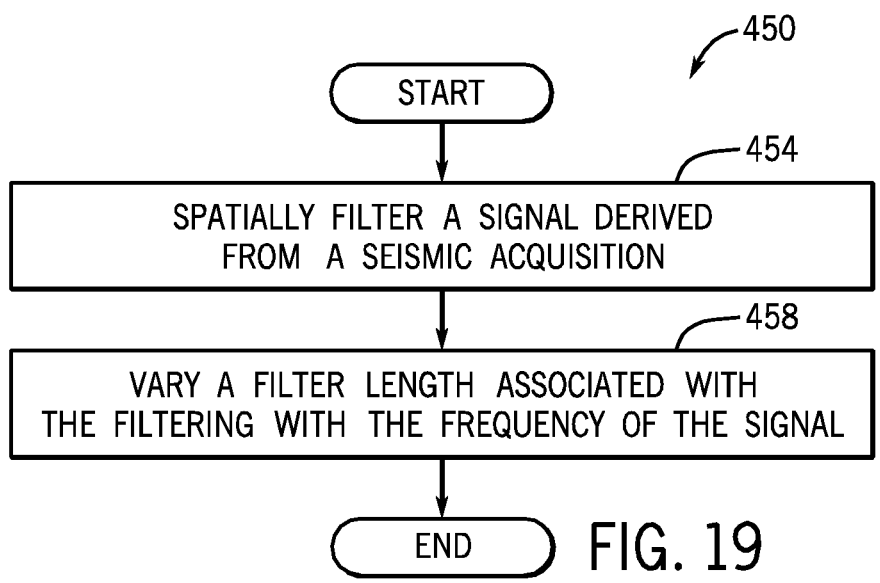
FIGS. 19, 20 and 22 are flow diagrams depicting techniques to use variable length filtering spatially filter a signal that is derived from a seismic acquisition according to example implementations.

Due to the variable filter length, the filtering of a signal derived from a seismic acquisition may be regulated such that the filter length changes with the frequency being filtered. Thus, referring to FIG. 19, a VLSF technique 450 in accordance with implementations includes spatially filtering (block 454) a signal that is derived from a seismic acquisition, including varying (block 458) a filter length associated with the filtering with the frequency of the signal. Thus, for shorter wavelengths, shorter filter lengths are used; and conversely, when the signal has a longer wavelength, longer filter lengths are employed. Among the advantages of this technique, better noise attenuation may be achieved, and the signal is preserved at lower frequencies due to the increased filter length. Additionally, the filtering exhibits an increased robustness to perturbations at higher frequencies due to the shorter filter length. Other and different advantages are contemplated, in accordance with other implementations.

The use of the VLSF has several advantages for purposes of handling edge effects. More specifically, because the VLSF filter is an FIR filter (in accordance with some implementations), the edge effects do not propagate into offsets further than the length of the filter. The longer filters are only used at the lower end of the frequency spectrum where the signal has a relatively long wavelength. For example, at 1 Hertz (Hz), the seismic signal has wavelengths longer than 1.5 kilometers (km). Furthermore, the VLSF is a linear phase filter, and therefore, there is no need for forward-backward, or zero-phase filtering.

Figure 21:
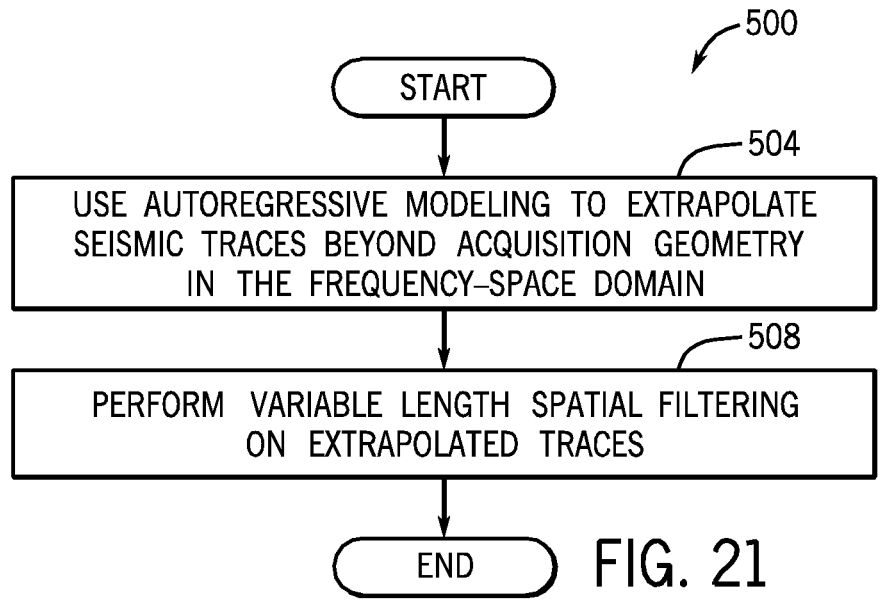
FIG. 21 is a flow diagram depicting a technique to mitigate edge effects due to filtering according to an example implementation.

In accordance with some implementations, the edge effects may be handled by first extrapolating the seismic data by using an auto-regressive prediction technique 500 that is depicted in FIG. 21. Referring to FIG. 21, pursuant to the technique 500, an auto-regressive model is used (block 504) to extrapolate seismic traces beyond the acquisition geometry in the frequency-space domain. More specifically, the auto-regressive model may be first fit and estimated at a particular frequency by using, for example, the autocorrelation technique that is described in Steven M. Kay, "Modern Spectral Estimation: Theory and Application," (Prentice-Hall 1988). Next, the data is extrapolated beyond the acquisition geometry by using the estimated autoregressive model. The amount of extrapolation is based on the filter length at that particular frequency. The technique 500 subsequently includes performing variable length spatial filtering on the extrapolated traces, pursuant to block 508. After application of the VLSF, the extrapolated portions of the traces are discarded. An advantage of this technique is that the autoregressive model may be forced to have a damped response, meaning that the amplitude of the predicted traces decay at larger offsets. It is noted that signals with longer wavelengths may be successfully extrapolated at larger distances. In other words, longer filters are used at lower frequencies, where the signal has longer wavelengths.

Other techniques may be used for purposes of handling edge effects, in accordance with other implementations. For example, in other implementations, forward-backward filtering may be used to mitigate edge effects. In this technique, the same filter is applied twice: once in forward direction in space and then in reverse direction in space. It is noted that the forward-backward filtering effectively doubles the original length of the filter and may result in transients with longer duration in space.

The transients may be reduced by choosing the initial conditions of the forward and backward filters, as described in Fredrik Gustafsson, "Determining the Initial States in Forward-Backward Filtering," IEEE Transactions on Signal Processing, pp. 988-992, April 1996, Volume 44, Issue 4 and in A. Özbek and P. Forman, FX-IIR Filter for Seismic Data, U.K. Patent Application 0805341.5, which was filed on Mar. 25, 2008. A further improvement is possible by the symmetric extension of the data before the first trace and after the last trace, respectively. This technique is particularly suitable when used with infinite impulse response (IIR) filters, due to the fact that IIR filters in general have non-linear phases; and forward-backward filtering is required to have a zero-phase filter response.

Figure 20:
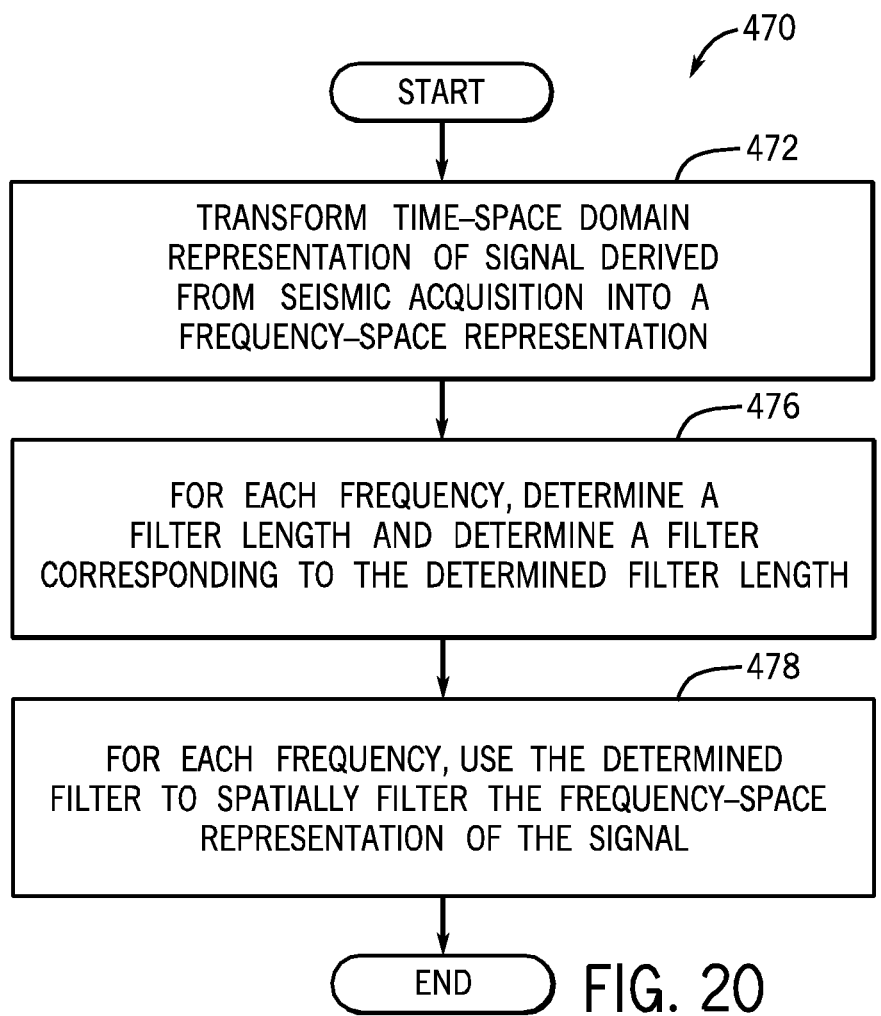

As a more specific example, the VLSF may be used in a signal processing technique 470 that is depicted in FIG. 20, in accordance with some implementations. Pursuant to the technique 470, a time-space domain representation of a signal that is derived from a seismic acquisition is first transformed (block 472) into a frequency-space representation. For each frequency, a filter length is determined, pursuant to block 476, which results in the determination of a corresponding filter that has this determined filter length. The determined filters may then be used to spatially filter the frequency-space representation of the signal at the associated frequencies, pursuant to block 478.

In accordance with some implementations, the signal may be transformed into the frequency-space domain using a forward Fourier transformation, which is described below:

$$S(f, x) = \sum_t s(t, x)e^{j2\pi ft}, \qquad \text{Eq. 37}$$

where "t" represents time; "x" represents space; "f" represents frequency; "s(t,x)" represents the time-space domain representation of the signal; and "S(f,x)" represents the frequency-space domain representation of the signal. The filter designed pursuant to the technique 470 may be represented by "H(f,x)" and the filtering may be described as follows:

$$G(f,x)=H(f,x)*_x S(f,x), \qquad \text{Eq. 38}$$

where "G(f,x)" represents the frequency-space representation of the filtered data, and "$*_x$" represents spatial convolution. The time-space domain representation of the filtered data, called "g(t,x)," may be determined using an inverse Fourier transformation, as described below:

$$\begin{aligned} g(t, x) &= \int G(f, x)e^{j2\pi ft}df \\ &= h(t, x) * s(t, x), \end{aligned} \qquad \text{Eq. 39}$$

where "*" represents the two-dimensional (2-D) convolution operator; and "h(t,x)" represents the inverse Fourier transformation of the frequency-space representation of the VLSF filters. In other words, the inverse Fourier transformation h(t,x) is the impulse response of the corresponding 2-D FIR filter. This means that the VLSF technique may be used to design multi-dimensional FIR filters. The resulting filters may be applied either in time-space; frequency-space; or frequency-wavenumber domains, depending on the particular implementation.

Figure 22:
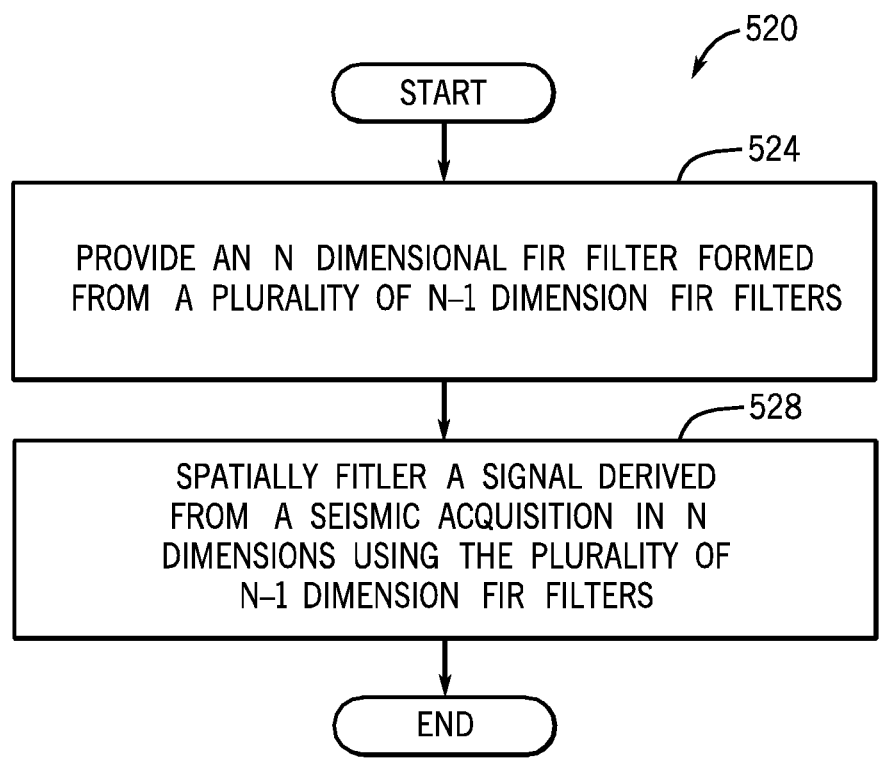

Thus, referring to FIG. 22, in accordance with some implementations, a technique 520 includes providing an n-dimensional FIR filter that is formed from a plurality of n−1 dimensional FIR filters, pursuant to block 524. A filter that is derived from a seismic acquisition may be spatially filtered in n dimensions using the plurality of n−1 dimensional FIR filters, pursuant to block 528. For example, a time-space filter may be designed and applied using space filters at every frequency.

The spatial wavenumber content of the signal becomes smaller at lower frequencies, and the variable filter length technique described above provides a very sharp filtering response at lower frequencies. However, this filtering technique does not process the signal within the boundaries of the signal cone 480 (FIG. 18). In order to remove noise within the signal cone 480, an adaptive noise attenuation technique may be used in conjunction with the above-described VLSF technique. Although it may be conceived that similar to the above-described VLSF-based technique, at each frequency, an adaptive noise attenuation algorithm may be used for noise attenuation, such an approach would create ringing noise and artifacts in the time-space domain when used with adaptive filters. The explanation for this behavior is that for the above-described VLSF-based techniques, the wavenumber response of the filters varies smoothly as a function of frequency. However, this smooth variation is not guaranteed when the filter coefficients at a frequency are computed as a function of the data at that frequency. As a result, rapid variation may occur among filter coefficients at adjacent frequencies; and these variations may result in high frequency signal dependent noise in the time-space domain.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
performing a seismic survey using a towed streamer having at least one sensor;
acquiring a measurement using the at least one sensor during the seismic survey;
using a filter having filtering parameters based at least in part on a dispersion curve of at least one vibration mode of the towed streamer to filter the measurement acquired by the at least one sensor of the streamer; and
using results of the filtering to suppress vibration noise present in the measurement, wherein using the filter and using results of the filtering includes convolving the measurement in a time-spatial domain to suppress the vibration noise, wherein using the results of the filtering further includes generating a vibration noise suppressed signal and applying frequency subband-based decomposition and reconstruction filtering to the vibration noise-suppressed signal.

2. The method of claim 1, further comprising:
determining the dispersion curve based at least in part on at least one physical characteristic of the streamer.

3. The method of claim 1, wherein using the filter and using the results of the filtering comprise:
demodulating a spectral energy of the measurement associated with the dispersion curve in a frequency-spatial domain to a wavenumber near zero;
filtering the modulated spectral energy to suppress spectral energy of the measurement other than spectral energy associated with the dispersion curve to generate a demodulated representation of the vibration noise;
modulating the demodulated representation of the vibration noise to a wavenumber associated with the dispersion curve; and
using the modulated representation of the vibration noise to suppress the vibration noise.

4. The method of claim 1, wherein using the filter and using results of the filtering comprise:
filtering spectral energy represented by the measurement in frequency-wavenumber space to suppress spectral energy not associated with the dispersion curve to generate a representation of the vibration noise; and
using the representation of the vibration noise to suppress the vibration noise.

5. The method of claim 1, wherein applying frequency subband decomposition and reconstruction filtering comprises:
decomposing a signal derived from a seismic acquisition into subbands, the subbands being associated with at least different frequency ranges or wavenumber ranges;
reconstructing the signal from the subbands;
spatially filtering the subbands; and
for each sub band, regulating a length of the filtering based on a frequency sub band or wavenumber associated with the subband.

6. The method of claim 5, wherein regulating the length of the filtering comprises varying a filter length with frequency.

7. An apparatus comprising:
an interface to receive data representing a measurement acquired by at least one sensor of a streamer while in tow; and
a processor to process the data to:
filter the data based at least in part on a dispersion curve for the streamer;
use results of the filtering to suppress the vibration noise present in the measurement;
convolve the measurement in a time-spatial domain to suppress the vibration noise; and
apply frequency subband-based decomposition and reconstruction filtering to the results of the filtering based on the dispersion curve.

8. The apparatus of claim 7, wherein the processor is adapted to:
demodulate a spectral energy of the measurement associated with the dispersion curve in a frequency-spatial domain space to a wavenumber near zero;
filter the modulated spectral energy to suppress spectral energy of the measurement other than spectral energy associated with the dispersion curve to generate a demodulated representation of the vibration noise;
modulate the demodulated representation of the vibration noise to a wavenumber associated with the dispersion curve; and
use the modulated representation of the vibration noise to suppress the vibration noise.

9. The apparatus of claim 7, wherein the processor is adapted to:
filter spectral energy represented by the measurement in a frequency-wavenumber domain to suppress spectral energy not associated with the dispersion curve to generate a representation of the vibration noise; and
use the representation of the vibration noise to suppress the vibration noise.

10. The apparatus of claim 7, wherein the processor is adapted to process the data to precondition the data prior to the filtering.

11. The apparatus of claim 10, wherein the processor is further adapted to transform coordinate axes, identify defective sensors and/or to precondition the data to perform inline regularization.

12. An article comprising a non-transitory computer readable storage medium to store instructions that when executed by a computer, cause the computer to:
- use a filter having filtering parameters based at least in part on a dispersion curve of at least one vibration mode of a towed streamer to filter a measurement acquired by at least one sensor of the streamer;
- use results of the filtering to suppress vibration noise present in the measurement;
- convolve the measurement in a time-spatial domain to suppress the vibration noise; and
- apply frequency subband-based decomposition and reconstruction filtering to the vibration noise suppressed signal.

13. The article of claim 12, the storage medium storing instructions that when executed by the computer cause the computer to:
- demodulate a spectral energy of the measurement associated with the dispersion curve in a frequency-spatial domain to a wavenumber near zero;
- filter the modulated spectral energy to suppress spectral energy of the measurement other than spectral energy associated with the dispersion curve to generate a demodulated representation of the vibration noise;
- modulate the demodulated representation of the vibration noise to a wavenumber associated with the dispersion curve; and
- use the modulated representation of the vibration noise to suppress the vibration noise.

14. The article of claim 12, the storage medium storing instructions that when executed by the computer cause the computer to:
- filter spectral energy represented by the measurement in a frequency-wavenumber domain to suppress spectral energy not associated with the dispersion curve to generate a representation of the vibration noise; and
- use the representation of the vibration noise to suppress the vibration noise.

15. The article of claim 12, the storage medium storing instructions that when executed by the computer cause the computer to:
- decompose a signal derived from a seismic acquisition into subbands, the subbands being associated with at least different frequency ranges or wavenumber ranges;
- reconstruct the signal from the subbands;
- spatially filter the sub bands; and
- for each sub band, regulate a length of the filtering based on a frequency sub band or wavenumber associated with the subband.

* * * * *